(12) United States Patent
Yamamoto

(10) Patent No.: US 7,619,913 B2
(45) Date of Patent: Nov. 17, 2009

(54) DEVICE, METHOD AND PROGRAM FOR MANAGING AREA INFORMATION

(75) Inventor: Akio Yamamoto, Tokyo (JP)

(73) Assignee: Hewlett-Packard Development Company, L.P., Houston, TX (US)

(*) Notice: Subject to any disclaimer, the term of this patent is extended or adjusted under 35 U.S.C. 154(b) by 362 days.

(21) Appl. No.: 11/720,325

(22) PCT Filed: Nov. 30, 2005

(86) PCT No.: PCT/JP2005/021965
§ 371 (c)(1),
(2), (4) Date: May 26, 2007

(87) PCT Pub. No.: WO2006/059629
PCT Pub. Date: Jun. 8, 2006

(65) Prior Publication Data
US 2008/0133484 A1 Jun. 5, 2008

(30) Foreign Application Priority Data
Nov. 30, 2004 (JP) .............................. 2004-346002

(51) Int. Cl.
*G11C 5/06* (2006.01)
(52) U.S. Cl. .............................. 365/63; 365/40; 365/94
(58) Field of Classification Search .................. 365/63, 365/40, 94
See application file for complete search history.

(56) References Cited
U.S. PATENT DOCUMENTS
6,125,367 A * 9/2000 Na .......................... 707/104.1
(Continued)

FOREIGN PATENT DOCUMENTS
EP 0942381 A2 9/1999
(Continued)

OTHER PUBLICATIONS
Instructions of "i-area" version 3.0, Mar. 29, 2004, NTT DoCoMo, Inc.
(Continued)

*Primary Examiner*—Pho M. Luu

(57) ABSTRACT

In an apparatus for managing area data, the first data structure for area management includes: a first index data structure including a first root node corresponding to a first set of areas containing a first area, first non-leaf nodes, and first leaf nodes; and a first data storage corresponding to the first leaf nodes. The second storage for area data stores one or more second data structures for area management constructed on the basis of area data collected from data in the first storage for area data based on one or more area attributes designated by a user. The second data structure for area management includes: a second index data structure including a second root node corresponding to a second set of areas containing second areas collected based on the one or more area attributes designated, second non-leaf nodes, and second leaf nodes; and a second data storage corresponding to the second leaf nodes. The storage for data associated with an area stores data associated with an area corresponding to the first areas and the second areas. The storage for region data stores a data structure for region management that is constructed on the basis of a node associated with a region which contains at least one or more of the first sets of areas. The data structure for region management includes a data structure in which at least one node for identifying the region links to either the first root node or the second root node.

11 Claims, 34 Drawing Sheets

U.S. PATENT DOCUMENTS

| | | | |
|---|---|---|---|
| 6,137,493 A * | 10/2000 | Kamimura et al. | 345/423 |
| 6,212,392 B1 * | 4/2001 | Fitch et al. | 455/456.2 |
| 6,687,688 B1 | 2/2004 | Fujihara et al. | |
| 6,732,231 B1 * | 5/2004 | Don et al. | 711/114 |
| 2001/0010048 A1 | 7/2001 | Kobayashi | |
| 2001/0051947 A1 | 12/2001 | Morimoto et al. | |
| 2002/0120370 A1 | 8/2002 | Parupudi et al. | |

FOREIGN PATENT DOCUMENTS

| | | |
|---|---|---|
| EP | 1217857 A2 | 6/2002 |
| JP | 10-124528 A | 5/1998 |
| JP | 11-328225 A | 11/1999 |
| JP | 2001-195425 A | 7/2001 |
| JP | 2001-209656 A | 8/2001 |
| JP | 2001-318938 A | 11/2001 |
| JP | 2002-073390 A | 3/2002 |
| JP | 2002-334030 A | 11/2002 |
| JP | 2003-263435 A | 9/2003 |
| JP | 2004-005339 A | 1/2004 |

OTHER PUBLICATIONS

Samet, Hanan, "The Quadtree and Related Hierarchical Data Structures," Computing Surveys, vol. 16, No. 2, Jun. 1984.

Beckmann, Norbert et al., "The R*-tree: An Efficient and Robust Access Method for Points and Rectangles+," Praktische Informatik, Universitaet Bremen, pp. 322-331, 1990.

Gaede, Volker, "Multidimensional Access Methods," ACM Computing Surveys, vol. 30, No. 2, Jun. 1998.

Guttman, Antonin, "R-Trees: A Dynamic Index Structure for Spatial Searching," University of California, Berkeley, pp. 47-57, 1984.

Samet, Hanan, "Data Structures for Quadtree Approximation and Compression," Communications of the ACM, vol. 28, No. 9, pp. 973-993, Sep. 1985.

* cited by examiner

AREA a1

DEVICE, METHOD AND PROGRAM FOR MANAGING AREA INFORMATION

RELATED APPLICATIONS

The present application is a National Phase entry of International Application Number PCT/JP2005/021965, filed Nov. 30, 2005, which claims priority from, Japanese Application Number 2004-346002, filed Nov. 30, 2004, the disclosures of which are hereby incorporated by reference herein in their entirety.

TECHNICAL FIELD

The disclosure relates to an apparatus, a method, and a computer program product for searching for, when a service and the like associated with a predetermined position is provided, a service and the like associated with the predetermined position from the position.

BACKGROUND

There are various methods as a method of providing a service associated with data on a position where a user is present.

For example, there is the "i-area" that is a location dependent service that can be used with "i-mode" handsets of NTT DoCoMo, Inc.

In this "i-area", it is possible to receive data for each of areas obtained by dividing the whole country of Japan into several hundred sections according to present location data of cellular phones from a base station.

Since it is possible to provide data for each of the areas divided, there are services specialized for the areas, such as weather forecasts, maps, traffic data, and restaurants and shopping data.

As similar services, there are the GPS position data service "eznavigation" of au, the map data service "J-Navi" of J-phone, the "imadoko service" and the "mopera position data service" for PHS of NTT DoCoMo, Inc., the "position data service" of DDI pocket, the "P-navi" of TTNet, and the like.

These services can provide data common to areas in a wide range, for example, weather forecasts, maps, and traffic data of the areas.

However, these services provide, based on data of a base station of cellular phones, data according to position data indicating to which area the base station belongs.

This position data is not data indicating detailed points such as latitude and longitude but is only an area code defined by communication carriers. Since position data corresponding to a position of the base station is used, the position data may be different from a location of use by a user.

Moreover, since only areas defined in advance are used, it is impossible to provide service data specialized for areas in a narrower range.

For mobile users owning portable terminals, a system for allowing the users to access data with limited positions, times, and amounts has been developed (http://www.spacetag.jp/).

However, in this system, since a circle defined by a center coordinate (latitude and longitude) and an effective radius is used as an effective space of data, there is a problem in that it is difficult to provide data and services for areas of more complicated shapes.

Further, since data is managed using only space-time data (with a space-time as an index), there is still a problem in that it is impossible to explicitly link data to a specific object in an actual space.

Moreover, it is examined to provide diligent services and data associated with the services based on accurate position data obtained by using not only GPSs and cellular phones but also various radio communication devices.

For example, in the method disclosed in U.S. Pat. No. 6,212,392, position data corresponding to a cell is used in a radio communication system that uses cellular phones.

This method is a method of judging whether a radio communication device is located within a designated area. With this method, a service provider can define and manage an area using an area representation based on quadtree data.

However, in the method, since overlapping of areas is not allowed because of limitation of a data structure, there is a disadvantage that it is impossible to allocate a plurality of different services to an identical point (region).

The following references disclose various known apparatuses or methods:

U.S. Pat. No. 6,212,392
http://www.spacetag.jp/;
H. Samet. The Quadtree and Related Hierarchical Data Structures. ACM Computing Surveys, Vol. 16, No. 2, 1984;
N. Beckmann, H.-P. Kriegel, R. Schneider and B. Seeger. The R*-tree: An Efficient and Robust Access Method for Points and Rectangles. Proceedings of ACM SIGMOD, pp. 322-331, 1990;
V. Gaede and O. Gunther. Multidimensional Access Methods. ACM Computing Surveys, Vol. 30, No. 2, June 1998; and
A Guttman. R-Trees: a dynamic index structure for spatial searching. Proceedings of the 13th ACM SIGMOD Conference, pp. 47-57, 1984.

The following problems are inherent in the conventional techniques as described above. The problems are summarized as follows.

(1) When pieces of area data provided by a plurality of different service providers are uniformly managed, a plurality of different services may be allocated to an identical region. An identical service provider may demand to define a plurality of services. In the quadtree data used as a conventional area (space data) managing method, there is a problem in that it is impossible to define a plurality of different service provision to an identical point and it is impossible to handle a plurality of pieces of service data present in an identical area.

(2) In the quadtree data, since it is necessary to designate the number of representation levels in advance, all object areas are represented at identical resolution, i.e., identical approximation accuracy. Regardless of the fact that, depending on a type of a service, it may be unnecessary to approximate the area with a high degree of accuracy, there is a problem in that it is impossible to set a different representation level for each service area when area data is managed using the quadtree.

In realization of service and data provision depending on a predetermined position, (1) management such as setting, update, and change of a service provision range (area), and (2) association of positions of mobile users (portable terminals) and areas are important and indispensable techniques.

There is a need for a method of establishing an area (or may be an n-dimensional space) representation that uses a data structure based on "R*-tree", which is one of multi-dimensional indexes, in order to flexibly and easily manage the service provision area.

There is a need for a method of finding at high speed, from position data obtained from a terminal such as a GPS or a cellular phone carried by a mobile user, in which service provision area defined in advance the user is present, and obtaining an identifier for uniquely identifying the area using a quadtree data structure or the like for respective area representations.

Moreover, there is further a need for a method of selectively finding, based on an area identifier obtained, data concerning various services and objects associated with an area with reference to profile data of a user or data on a service provider, a spatial positional relation with adjacent areas, and the like, and presenting the data to the user.

In an embodiment, an apparatus for managing area data, comprises:
a first storage for area data;
a second storage for area data;
a storage for data associated with an area; and
a storage for region data, wherein:
the first storage for area data stores one or more first data structures for area management;
the first data structure for area management includes:
a first index data structure including a first root node corresponding to a first set of areas containing a first area, first non-leaf nodes, and first leaf nodes; and
a first data storage corresponding to the first leaf nodes;
the second storage for area data stores one or more second data structures for area management constructed on the basis of area data collected from data in the first storage for area data based on one or more area attributes designated by a user;
the second data structure for area management includes:
a second index data structure including a second root node corresponding to a second set of areas containing second areas collected based on the one or more area attributes designated, second non-leaf nodes, and second leaf nodes; and
a second data storage corresponding to the second leaf nodes;
the storage for data associated with an area stores data associated with an area corresponding to the first areas and the second areas;
the storage for region data stores a data structure for region management that is constructed on the basis of a node associated with a region which contains at least one or more of the first sets of areas; and
the data structure for region management includes a data structure in which at least one node for identifying the region links to either the first root node or the second root node.

In a further embodiment, a program for managing a first storage for area data, a second storage for area data, a storage for data associated with an area, and a storage for region data, which is executed in an apparatus for managing area data having a structure in which:
the first storage for area data stores one or more first data structures for area management;
the first data structure for area management includes:
a first index data structure including a first root node corresponding to a first set of areas containing a first area, first non-leaf nodes, and first leaf nodes; and
a first data storage corresponding to the first leaf nodes;
the second storage for area data stores one or more second data structures for area management constructed on the basis of area data collected from data in the first storage for area data based on one or more area attributes designated by a user;
the second data structure for area management includes:
a second index data structure including a second root node corresponding to a second set of areas containing second areas collected based on the one or more area attributes designated, second non-leaf nodes, and second leaf nodes; and
a second data storage corresponding to the second leaf nodes;
the storage for data associated with an area stores data associated with an area corresponding to the first areas and the second areas;
the storage for region data stores a data structure for region management that is constructed on the basis of a node associated with a region which contains at least one or more of the first sets of areas; and
the data structure for region management includes a data structure in which at least one node for identifying the region links to either the first root node or the second root node.

DETAILED DESCRIPTION

Preferred embodiments of the present invention will be hereinafter described.

Embodiment 1

Figure 1:
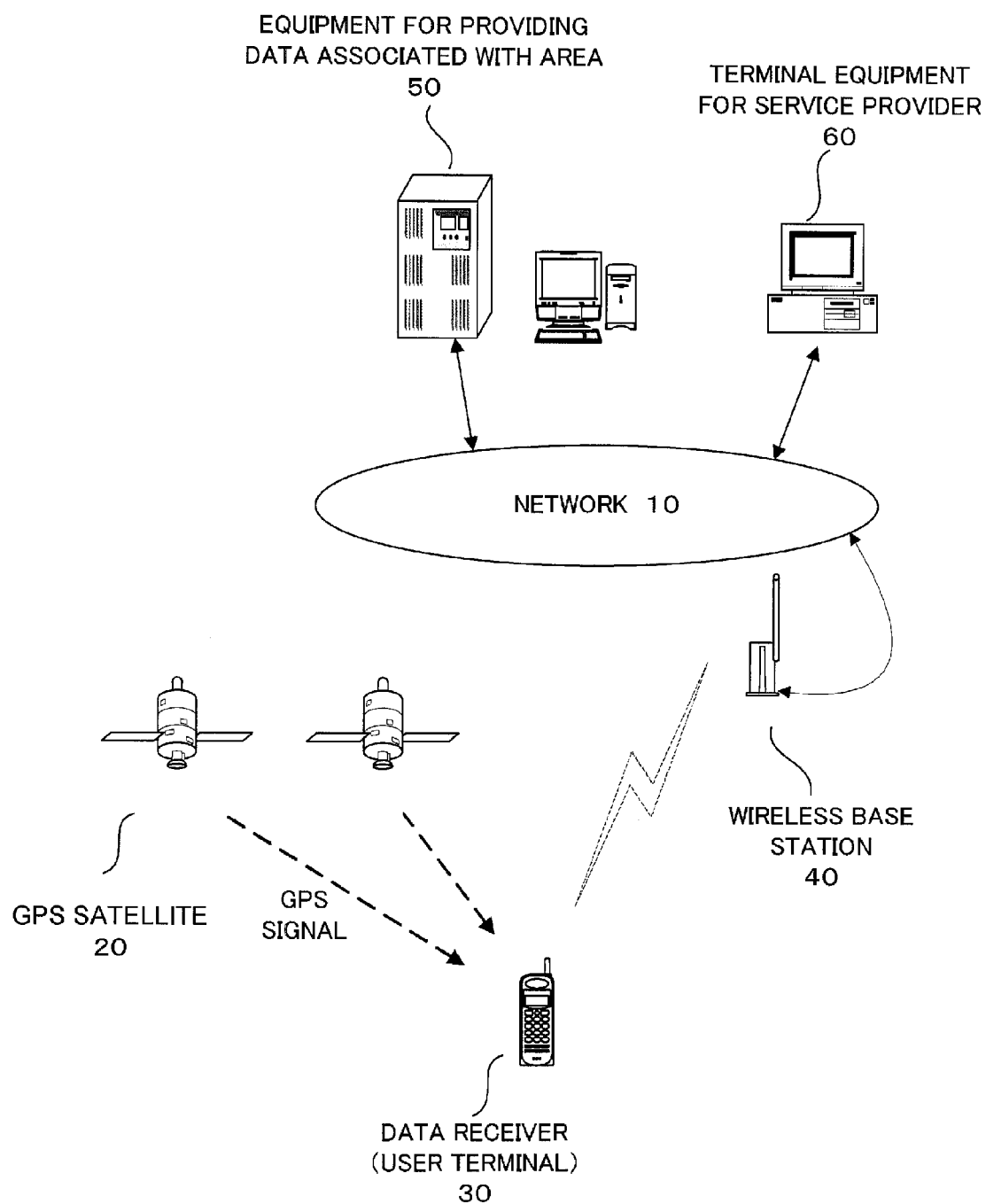
FIG. 1 is a diagram showing an outline of an embodiment of the present invention.

FIG. 1 explains an embodiment of the present invention. When a user wants to receive a service based on position data of where the user is currently located, a GPS 20 or other unit is used to obtain the user's current position data. The GPS will now be explained as one example of a unit for obtaining the position data of where the user is currently located. The GPS refers to a system using satellites to determine precisely one's own location on the earth's surface. The GPS uses electromagnetic waves from GPS satellites to calculate longitudes, latitudes, and the like with high precision. Four GPS satellites are distributed on each of six circular orbits at altitudes of approximately 20,000 km, and these satellites are managed by the United States Department of Defense. Once the user has obtained his/her position data, he/she can access area-associated data provision equipment 50 on a network, from a data receiver 30 via a wireless base station 40. Accordingly, the user can obtain one or more sets of service data corresponding to his/her particular position data. Furthermore, the service provider can use terminal equipment for service provider 60 to register data, which is a combination of the service which the service provider itself will provide and data associated with the service area, into the area-associated data provision equipment 50.

Figure 2:
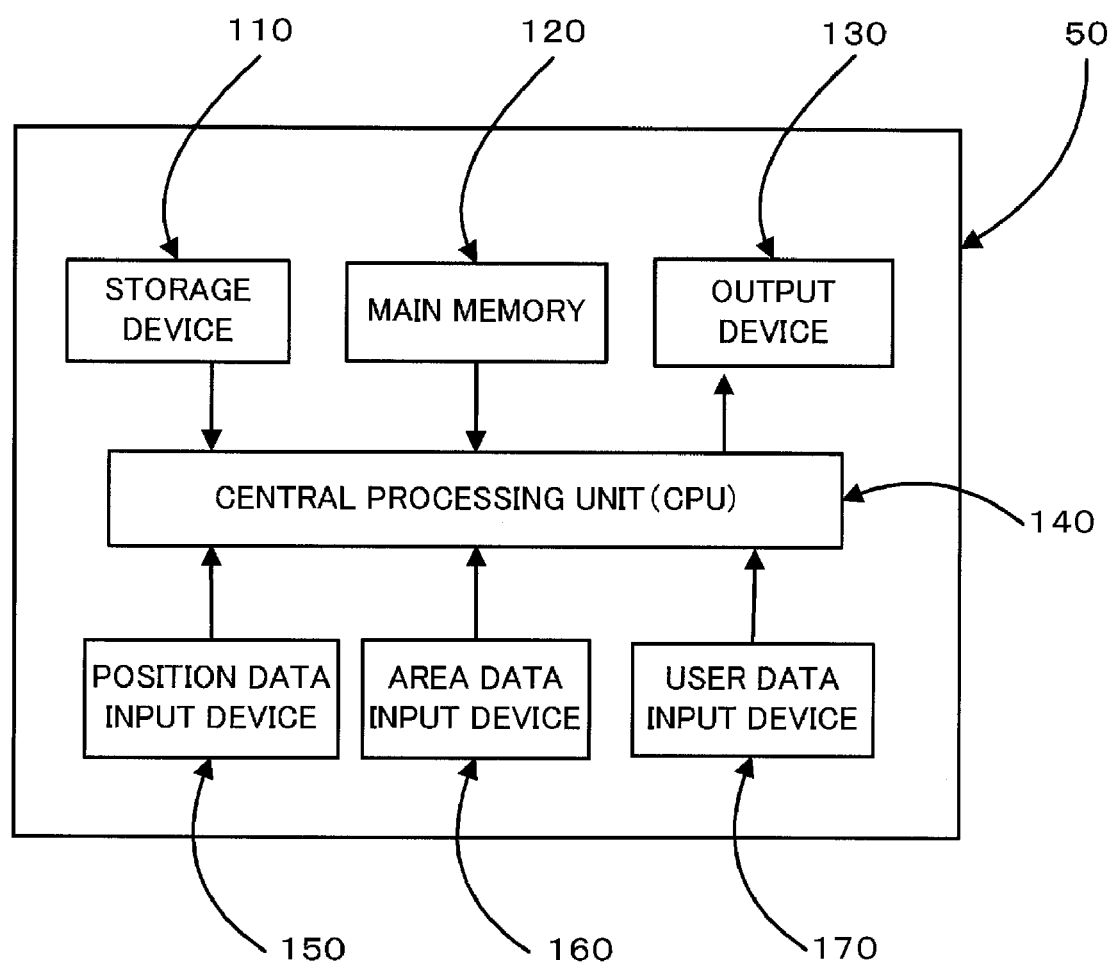
FIG. 2 is a block diagram showing an apparatus of an embodiment of the present invention.

FIG. 2 shows the area-associated data provision equipment 50 implementing the present invention. The area-associated data provision equipment 50 includes a storage unit 110, a main memory 120, an output device 130, a central processing unit (CPU) 140, a position data input device 150, an area data input device 160, and a user data input device 170. The service provider inputs in advance the service content which is to be provided, and data associated with the corresponding service area, from the area data input device 160 via a network or the like. The user can also input in advance his or her sex, age, preference, and other personal data via the network or the like, from the user data input device 170. The central processing unit 140 stores these pieces of data in the storage device 110. The user inputs his or her current position data from the position data input device 150 via the network or the like. The central processing unit 140 reads out the service data that corresponds to the position data stored in the storage device 110, and outputs the result to the output device 130.

Figure 3A:
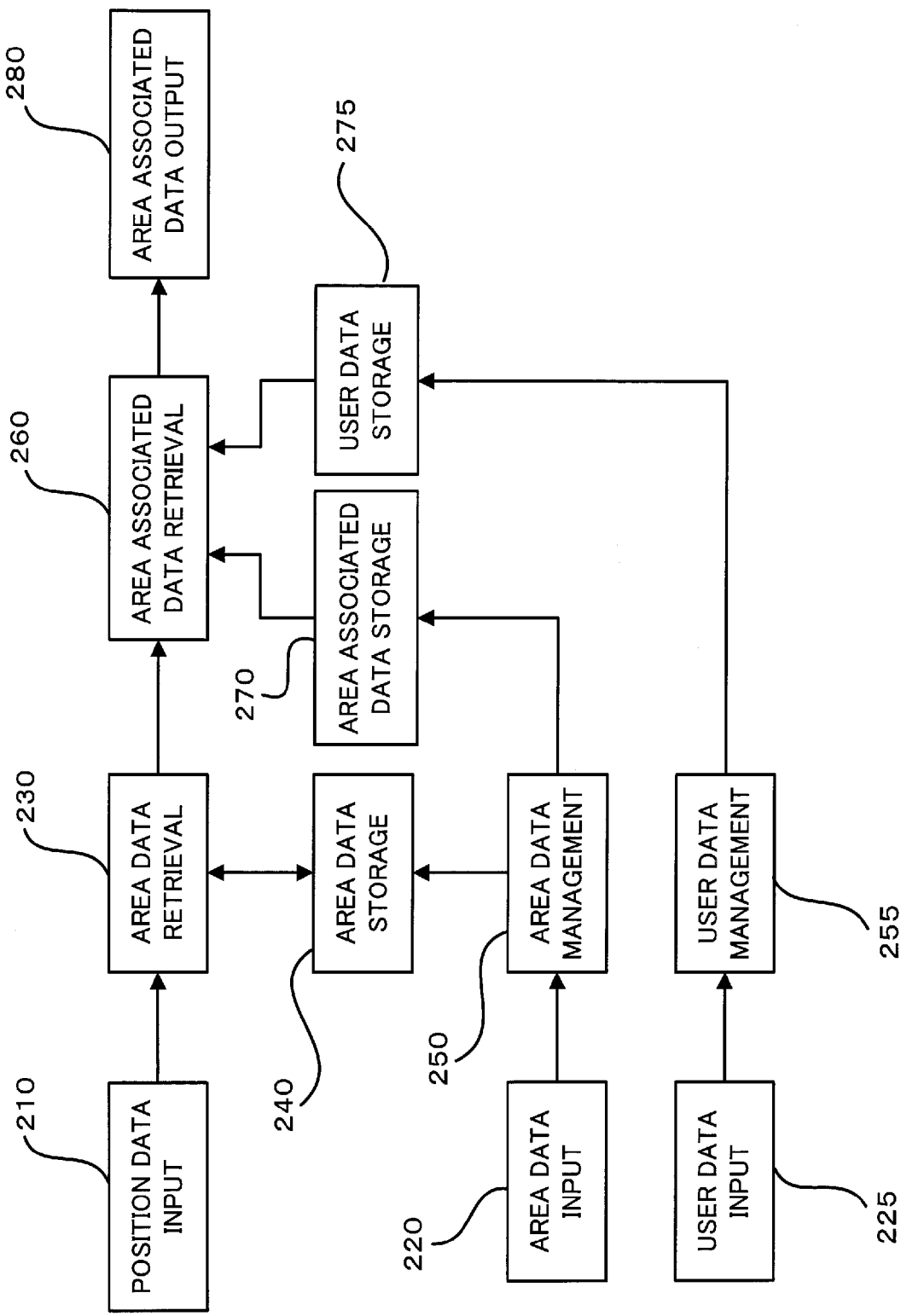
FIG. 3a is a functional block diagram of the apparatus of an embodiment of the present invention.

FIG. 3a is a functional block diagram of the area-associated data provision equipment 50 based on the user's position according to the present invention. Reference numeral 210 refers to position data input; 220, area data input; 225, user data input; 230, area data retrieval; 240, area data storage; 250, area data management; 255, user data management; 260, area-associated data retrieval; 270, area-associated data storage; 275, user-associated data storage; and 280, area-associated data output. These are explained in detail hereinafter.

In accordance with Embodiment 1, explanation is now given regarding a method of creating the data of the service area by the vectorization of the area, and retrieving these data.

(1) Position Data Input (Block 210)

In this block, the position data is inputted from the user. The user uses the GPS or the like to detect the position where he/she is located, and then inputs that position data through the network into the position data input (block 210) of the area-associated data provision equipment.

(2) Area Data Input (Block 220)

In this block, the data associated with the service area (shape, position, etc.) which is to be provided by the service provider is inputted. The service provider uses a digitizer or a graphical user interface or the like to perform vectorization of the service area, and inputs the respective data and the corresponding service content.

(3) User Data Input (Block 225)

In this block, the user inputs in advance his or her own personal data such as his or her own sex, age, preference, and lists of promotional campaign programs which he or she is participating in. Accordingly, when service data for the position data inputted by the user is selected, it is possible to output only the data which the user needs.

(4) Area Data Storage (Block 240)

Figure 3B:
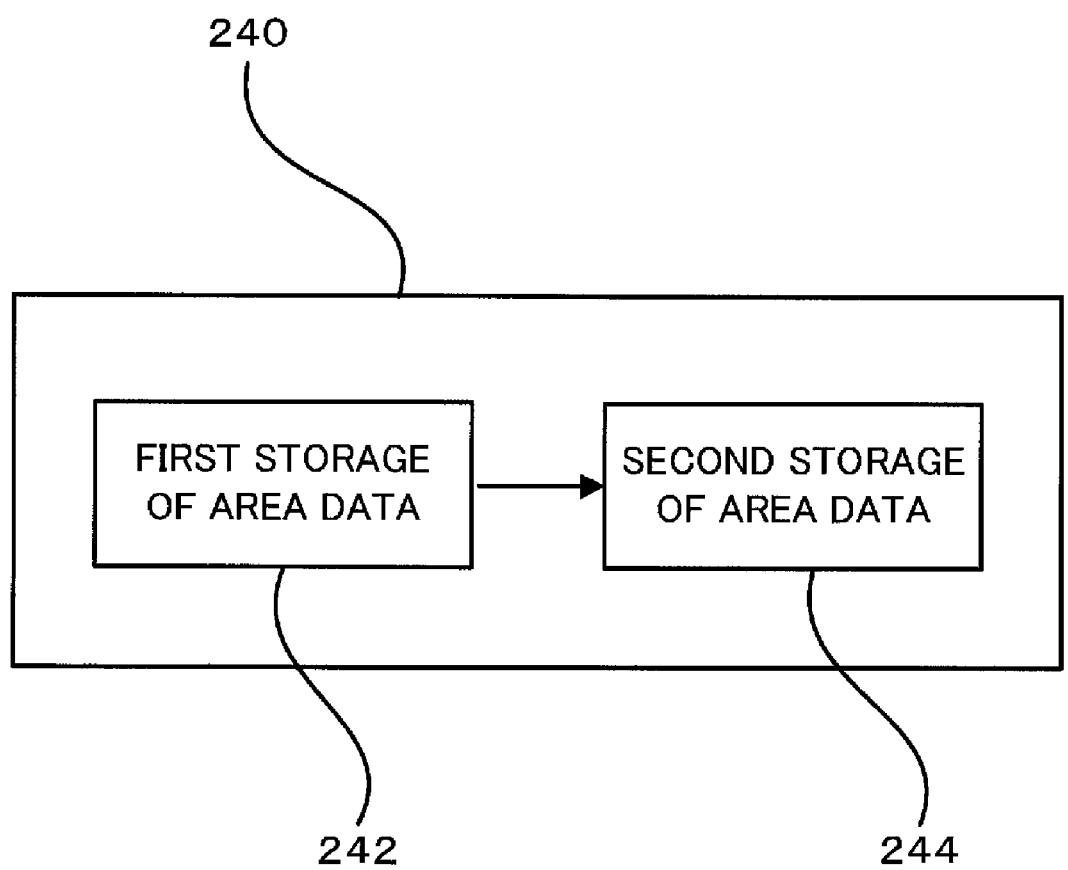
FIG. 3b is a block diagram of an area-data storage of an embodiment of the present invention.

As shown in FIG. 3b, the area data storage includes a first area data storage and a second area data storage. The first area data storage stores wide-range area data, and can detect the user's position over a wide range. The second area data storage stores small-range area data, and can detect the user's position within a narrow range to identify the particular service area.

Figure 4A:
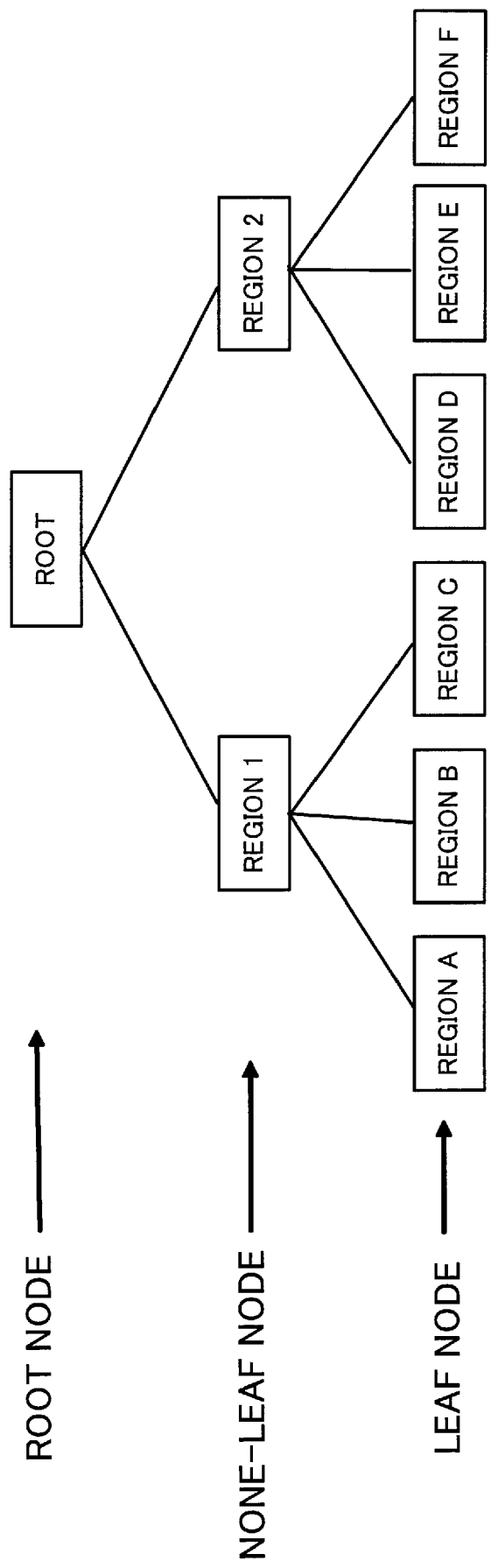
FIG. 4a is a diagram showing an index data structure.
Figure 4B:
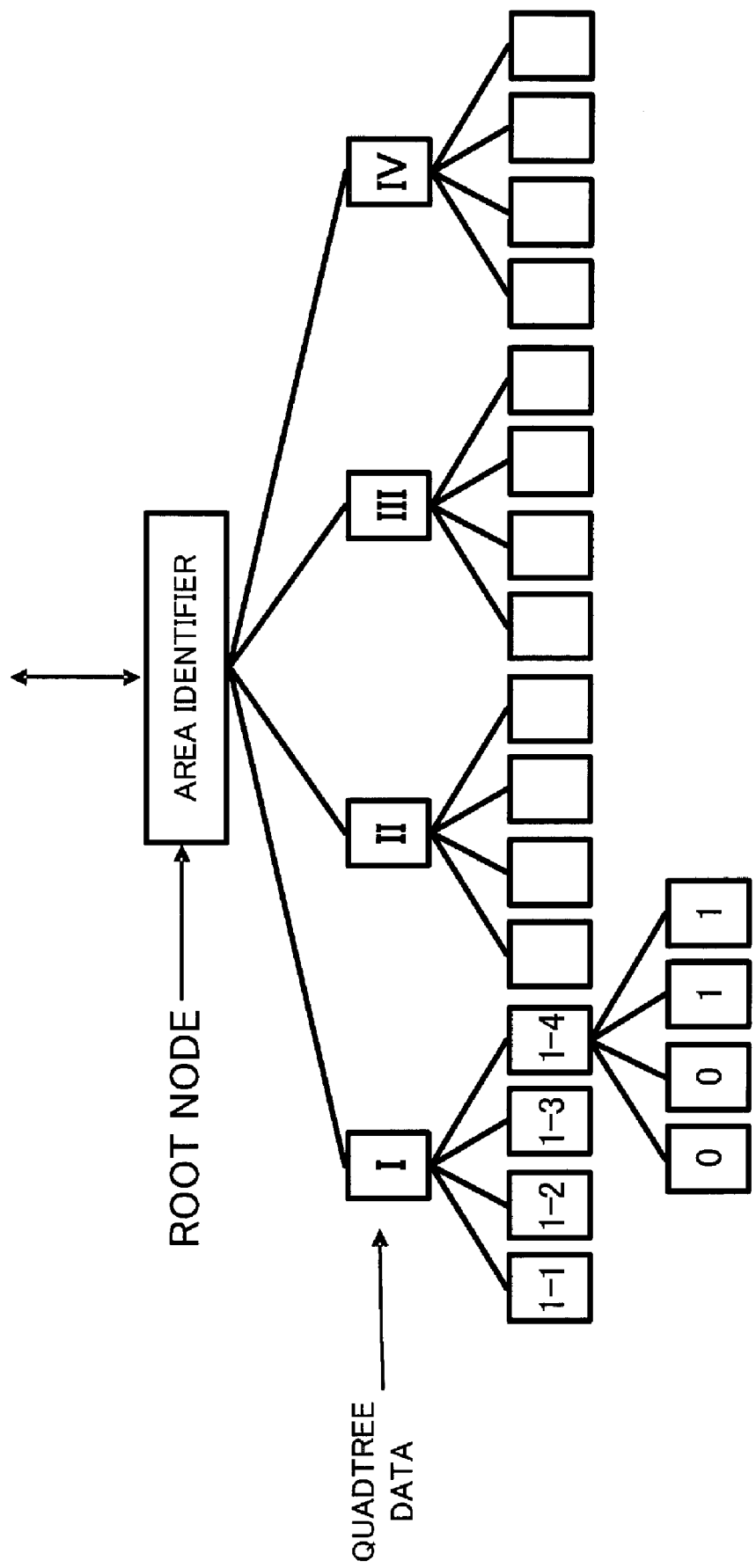
FIG. 4b is a diagram showing quadtree data.

According to Embodiment 1, the first area data storage stores an "index structure using R*-tree," which is shown in FIG. 4 (hereinafter referred to as "index structure" in the present application). Furthermore, the second area data storage stores "quadtree data" shown in FIG. 4b.

(5) Area Data Management (Block 250)

This block confirms the service content defined by the service provider, and whether or not the data associated with the service area (its shape, position, etc.) are appropriate, and manages the registering, deleting, and updating this data.

(6) User Data Management (Block 255)

This block manages the user data inputted by the user. In other words, this block confirms whether the user's registration and the personal data inputted by the user conform to the regulations, and manages the registering, deleting, and updating of this data.

(7) Area Data Retrieval (Block 230)

This block retrieves the area where the user is located from the area data storage, based on the position data identified by the data receiver held by the user, and obtains an identifier that uniquely identifies the respective area. In a case where multiple service areas are defined such that they overlap at a single position, multiple area identifiers are obtained from the position data.

(8) Area-Associated Data Retrieval (Block 260)

Based on the area identifier obtained at the block 230, various data associated with that area are searched. In the case where multiple services are being provided to a single position, it is possible to perform the retrieval based on the multiple area identifiers obtained from the position data. Furthermore, based on the user-associated data stored in the block 275, it is possible to select and provide only data that meets the conditions set by the user or the service provider.

(9) Area-Associated Data Storage (Block 270)

This block stores data associated with services and the like provided at each area, that has been inputted by the service provider. This data is stored via the area data management of the block 250.

(10) User-Associated Data Storage (Block 275)

This block stores the personal data of each user, which each user has inputted. These pieces of data are stored via the user data management of the block 255.

(11) Area-Associated Data Output (Block 280)

This block outputs retrieval results and sends them over the network to the user.

Hereinafter, detailed explanations are given regarding each part.

1. Minimum Bounding Rectangle (MBR)

Figure 5:
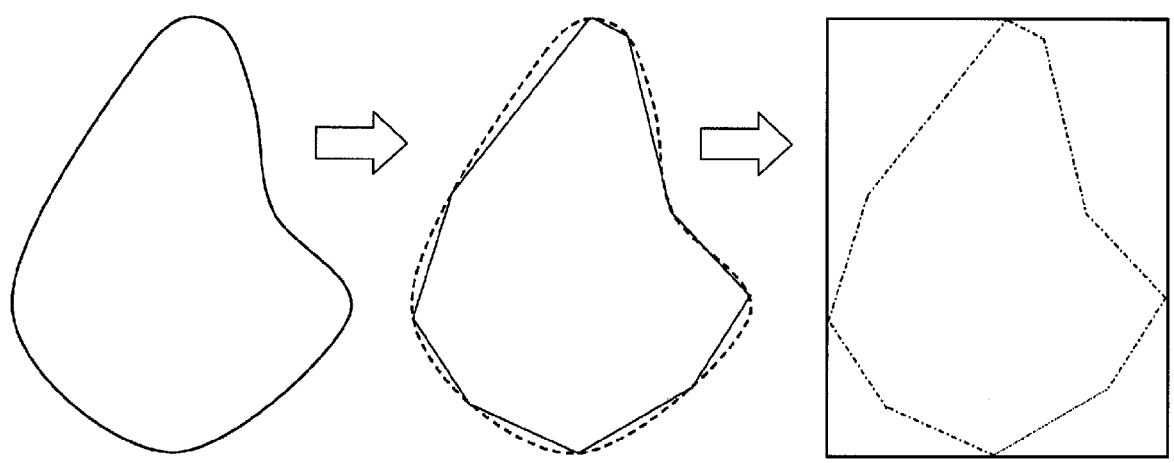
FIG. 5 is a diagram for explaining a concept of a minimum bounding rectangle (MBR).

First, explanation is given regarding MBRs. An MBR is a rectangle circumscribing a polygon that approximates an area, by the vectorization of the aforementioned area. In other words, as shown in FIG. 5, the area's peripheral boundary lines (FIG. 5, left side) are approximated as a polygon of multiple straight lines and vertices (FIG. 5, center). This polygon is represented as a rectangle, with the polygon circumscribed by the minimum bounding rectangle (MBR) (FIG. 5, right side). The precision level of the approximation can be set as desired, based on data volume and a tolerance.

2. Index Structure

Figure 6:
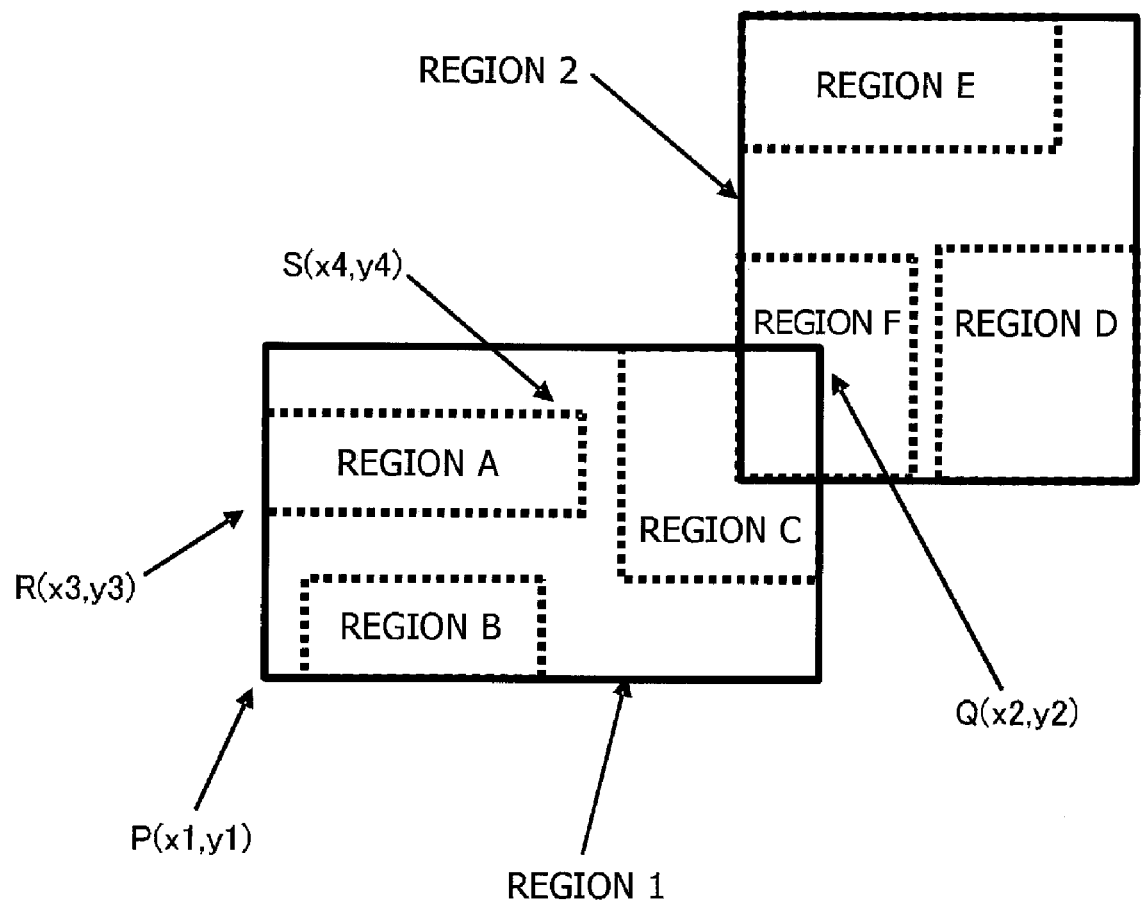
FIG. 6 is a diagram showing a region corresponding to the index data structure.

FIG. 6 shows MBRs of a region A, a region B, and a region C, respectively, and a region 1 which is an MBR that circumscribes these. Furthermore, there are shown MBRs of a region D, a region E, and a region F, respectively, and a region 2, which is an MBR that circumscribes these. The data expressed by the eight MBRs of the regions A through F, the region 1, and the region 2, which are shown in FIG. 6, are stored in the "index structure" shown in FIG. 4a. Here, a node storing the regions 1 and 2 is called a "non-leaf node." A node storing the regions A through F, which are to be managed and stored, is called a "leaf node." In the "index structure" shown in FIG. 4a, all the MBR data are managed in a multiway tree structure, and the topmost portion of this structure is a "root node." At the second level, the "region 1" and the "region 2" are shown as the non-leaf nodes, and these correspond respectively to the "region 1" and the "region 2" shown in FIG. 6. In the third-level blocks, the "region A" through the "region F" are shown as the leaf nodes, and these correspond respectively to the "region A" through the "region F" in FIG. 6.

The non-leaf node has an MBR circumscribing the group of MBRs of the leaf nodes located at lower positions, and multiple pointers that refer to these leaf nodes. Each leaf node has an MBR for a targeted region, and a pointer to quadtree data corresponding to that MBR. According to the example shown in FIG. 4a, the "non-leaf node" includes the data shown in (Formula 1), and the "leaf node" includes the data shown in (Formula 2).

$$\text{Non-leaf node} = (I, \text{pointer to leaf node}) \quad \text{(Formula 1)}$$

$$\text{Leaf node} = (I, \text{pointer to quadtree data}) \quad \text{(Formula 2)}$$

Here, $I=(I_S, I_E)$, where $I_S=(I_{S_1}, I_{S_2}, \ldots, I_{S_n})$, and $I_E=(I_{E_1}, I_{E_2}, \ldots, I_{E_n})$. "$I_S$" represents a coordinate of one corner point of the MBR in n-dimensional space. "$I_E$" represents a coordinate of the other corner point that forms a counterpart of $I_S$ in the MBR. In two-dimensional space, $I=(I_S, I_E)$, where $I_S=(I_{S_1}, I_{S_2})$, and $I_E=(I_{E_1}, I_{E_2})$ The non-leaf node indicating the region 1 stores coordinates P(x1, y1) and Q(x2, y2), which express the MBR of the region 1 (see FIG. 6). The leaf node indicating the region A stores coordinates R(x3, y3) and S(x4, y4), which express the MBR of the region A (see FIG. 6).

Here, the position data inputted by the user is retrieved. First, a search is performed to determine whether the user is in the region 1 or the region 2. Next, following the "pointer to the leaf node" which is included in the non-leaf node corresponding to the region that has been retrieved, all the leaf nodes in lower positions are retrieved. Once all the leaf nodes are retrieved, the "pointer to the quadtree data" which is included in each leaf node is followed to retrieve the quadtree data (FIG. 4b).

3. Quadtree Data

Since the "index structure" is approximated by the MBR, it is possible to quickly narrow down the region in which the inputted position is included, but the individual service area provided by the service providers cannot be identified. In order to accurately identify the specific area, it is necessary to further retrieve the "quadtree data" designated by the pointer that points to the quadtree data, which is included in the leaf node.

The quadtree data is a structure using one type of data compression method. Furthermore, it has a structure that is appropriate for determining, with a given degree of precision, whether or not a particular position is located within the approximating polygon. When the data of the approximating polygon is expressed by as quadtree data, it can be expressed as a tree structure such as shown in FIG. 4b.

Figure 7:
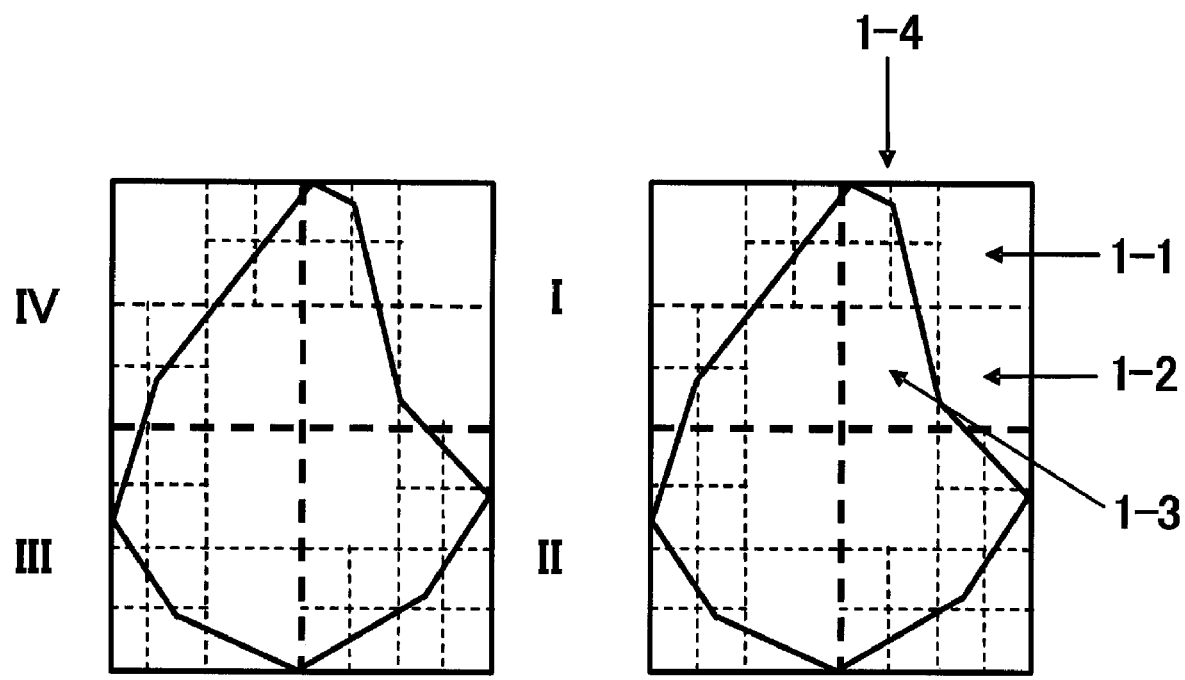
FIG. 7 is a diagram for explaining the quadtree data.

The top position in quadtree data is called a root node. This node stores an "area identifier" which uniquely identifies the region A shown in FIG. 6. FIG. 7 is a diagram showing an example of the approximating polygon and the MBR for the service area corresponding to the region A. The second level of the quadtree shown in FIG. 4b stores data corresponding to a first quadrant (I), a second quadrant (II), a third quadrant (III), and a fourth quadrant (IV), which are created by dividing the MBR shown on the left side of FIG. 7 into four parts. The third level stores data corresponding to blocks (1-1, 1-2, 1-3, 1-4) created by further dividing the first quadrant (I) shown on the left of FIG. 7 into four parts. The data that is stored is given 1 (one) or 0 (zero) depending on whether it is inside or outside of the approximating polygon. An explanation will now be given with reference to the right side of FIG. 7. The entire region of the block "1-1" is outside of the polygon, so 0 (zero) is assigned to it. The block "1-2" contains a region outside of the polygon which is larger than a region inside of the polygon, so 0 (zero) is assigned to it. The block "1-3" contains a region inside of the polygon which is larger than a region outside of the polygon, so 1 (one) is assigned to it. The fourth level stores data corresponding to blocks created by further dividing "1-4" into four parts. That is, at each node the data are respectively given 0 (zero), 0 (zero), 1 (one), and 1 (one). Here, how many times each quadrant is divided can be determined as desired by the service provider, depending on the data volume and the like.

4. Retrieval of Area-Associated Data Based on the Position Data (a) Retrieval of the Area Identifier (Block 230)

The retrieval of the area identifier corresponds to the block 230 in FIG. 3a. The area where the user is located is retrieved from the area data storage based on the position data that has been identified, and an area identifier which uniquely identifies that area is obtained. A retrieval method is explained below.

(i) The position data obtained from the GPS, cellular phone, or the like is received from the user and converted into coordinates data, which is used for storing in the area data storage.

(ii) A Guttman search algorithm (non-patent document 6) is executed on the index structure (FIG. 4a), all the leaf nodes which store MBR data containing that position data are retrieved, and the pointer to the corresponding quadtree data is read out.

(iii) The search algorithm is executed on the "quadtree data" indicated by the leaf node pointer obtained at the step (ii).

The MBR data represents the rectangle which circumscribes the approximating polygon. Therefore, the quadtree data can be used to confirm whether or not the inputted position data is inside of the polygon (i.e., service area) indicated by the MBR data.

(iv) In the case where the position obtained from the position data is inside the area, the area identifier stored in the quadtree root node is returned as the search result. The same search is repeated on all the leaf nodes obtained at the step (ii), and the area identifiers for all the areas to which that position data belongs are obtained. Note that in the case where that position data is outside all the areas, a "NULL" response is returned.

(b) Retrieval of the Area-Associated Data (Step 260)

The retrieval of the area-associated data corresponds to the block 260 in FIG. 3a. Various data associated with the area that is currently being dealt with is retrieved based on the area identifier obtained by the retrieval of the area identifier (a). In a case where multiple area identifiers are retrieved from single position data, multiple services or multiple sets of associated data are retrieved. Here, the personal data of the user stored in the user-associated data storage (block 275) is used to select, from the retrieved data, only the data which satisfies the conditions set by that user or by the service provider.

Now, an explanation is given by citing examples. Assume that data retrieval requests are received from users A and B, who are located at the same place, and multiple areas 1, 2, and 3 are identified as areas corresponding to that position data. Also assume that companies 1, 2, and 3 are respectively registered as service providers in these three areas. Furthermore, assume that in the user-associated data storage there are stored {companies 1, 3, 5, 6} as a promotional campaign list indicating campaigns which the user A is participating in, and {companies 2, 3, 4, 7} as a promotional campaign list indicating campaigns which the user B is participating in. In this case, for the user A, the data that is associated with the areas 1 and 3, which correspond to the companies 1 and 3, will be selected and outputted as the retrieval results. Similarly, for the user B, the data associated with the areas 2 and 3, which correspond to the companies 2 and 3, will be outputted.

In another example, assume that the user-associated data storage stores that the user A is a male in his twenties, and the user B is a female in her forties. Furthermore, assume that the access control data is also included, where the areas 1 and 2 have associated data stating "provide to males," and the area 3 has associated data stating "provide to people 30 years of age and older." In this case, for the user A, the data associated with area 1, which corresponds to the company 1, will be selected and outputted as the retrieval result. (The area 3 is not selected because of the condition "30 years of age and older.") Similarly, for the user B, the data associated with the area 3, which corresponds to the company 3, will be outputted. (The area 2 is not selected due to the condition of "male.")

(c) Output of Retrieval Result (Step 280)

Output of the retrieval result corresponds to the block 280 in FIG. 3a. The retrieval result is outputted and sent via the network to the user.

5. Algorithm

An explanation is now given regarding the algorithm (FIG. 8) of the method for retrieving the associated data based on the position data according to the present invention.

Step 10: Step of receiving the position data and the user identifier.

The user sends the position data indicating where the user is located and his/her user identifier from his/her data receiver via the network. The area-associated data provision equipment receives these pieces of data.

Step 20: Step of retrieving all the leaf nodes included in the position data.

The Guttman search algorithm is executed on the index structure (FIG. 4a) to retrieve all the leaf nodes storing the MBR data corresponding to the position data received from the user.

Step 30: Step of obtaining the area identifier from the quadtree retrieval result.

The search algorithm is executed on the quadtree data corresponding to all the leaf nodes that have been detected at Step 20. Referring to the quadtree data indicated by the pointer stored in the leaf node, it is determined whether or not the user's position is within the area designated by the service provider. When it is within the area, the area identifier stored in the root node of that quadtree data is returned as the response. When the user's position is outside of the area, then "NULL" is returned as the response.

Step 40: Step of searching for the data associated with the area based on the obtained area identifier.

This step retrieves various data associated with the area that is currently being dealt with, such as maps of nearby areas, time tables, train transfer guides, circumstances of the train accident, whether information, road traffic information and the like, or various services provided in that area including, for example, data about merchandise sold by stores in that area, along with prices and inventory status.

Step 50: Step of selecting the associated data based on the user-associated data.

This step uses the user identifier that has been sent together with the position data, refers to that user's personal data and data about the service provider, which are stored in advance, and selectively retrieves the services and associated data which should be provided to that user.

Step 60: Step of outputting the retrieval result.

This step outputs the data retrieved at Step 50 onto a display device of the data receiver.

Embodiment 2

Embodiment 2 and Embodiment 3 will now be explained by citing the example in which "combination of multiple rectangles" is used as the data structure of the service area.

In Embodiment 2, the first area data storage stores an "index structure" for managing the MBR that circumscribes all the rectangles approximating each of the areas. The second area data storage stores area data that is approximated by combining multiple rectangles. "Rectangle group data" (Formula 4, described below) is used in the second area data storage.

In Embodiment 3, the first area data storage stores an "index structure" for individually managing each of the multiple rectangles that approximate the area. The second area data storage is not used.

Hereinafter, an explanation is given regarding Embodiment 2. In a case of approximating a shape shown on the left in FIG. 9a, the shape can be approximated with multiple rectangles as shown on the right of FIG. 9a. The number of rectangles may be increased in order to improve the precision level of the approximation, and this requires large amounts of data for more rectangles to be maintained. In the diagram on the right in FIG. 9a, the approximation is made with a total of 5 rectangles, from rectangle A to rectangle E. Furthermore, as shown in the diagram on the right in FIG. 9b, it is possible to define an MBR that circumscribes entirely the rectangle A through the rectangle E.

The leaf node shown in FIG. 4a includes data defined in (Formula 3).

Leaf node=(I , pointer to rectangle group data)  (Formula 3)

Here, the leaf node stores data of an MBR that circumscribes all of m number of rectangles approximating the service area. In the diagram on the right in FIG. 9b, this MBR corresponds to the portion that is marked by a broken line. Here, I=(Is, IE), where Is=($Is_1$, $Is_2$, . . . , $Is_n$), and IE=($IE_1$, $IE_2$, . . . , $IE_n$). "Is" represents a coordinate of one corner point of the MBR in n-dimensional space. "IE" represents a coordinate of the other corner point that forms a counterpart of Is in the MBR. In two-dimensional space, I=(Is, IE) where Is=V (x7, y7), and IE=W(x8, y8) taking FIG. 9 as an example.

Furthermore, as shown in (Formula 4), the "rectangle group data" is a combination of the area identifiers and m number of rectangle data.

Rectangle group data=(Area identifier, (I1, I2, . . . , Im)),  (Formula 4)

where IJ represents a coordinate of the MBR of a Jth rectangle. Here, IJ can also be expressed as IJ=(IJs, IJE). In n-dimensional space, IJs=($IJs_1$, $IJs_2$, . . . , $IJs_n$), and IJE=($IJE_1$, $IJE_2$, . . . , $IJE_n$). IJs represents a coordinate of one corner of the MBR of the Jth rectangle. IJE represents a coordinate of the other corner that is a counterpart of IJs in the MBR.

Figure 9A:
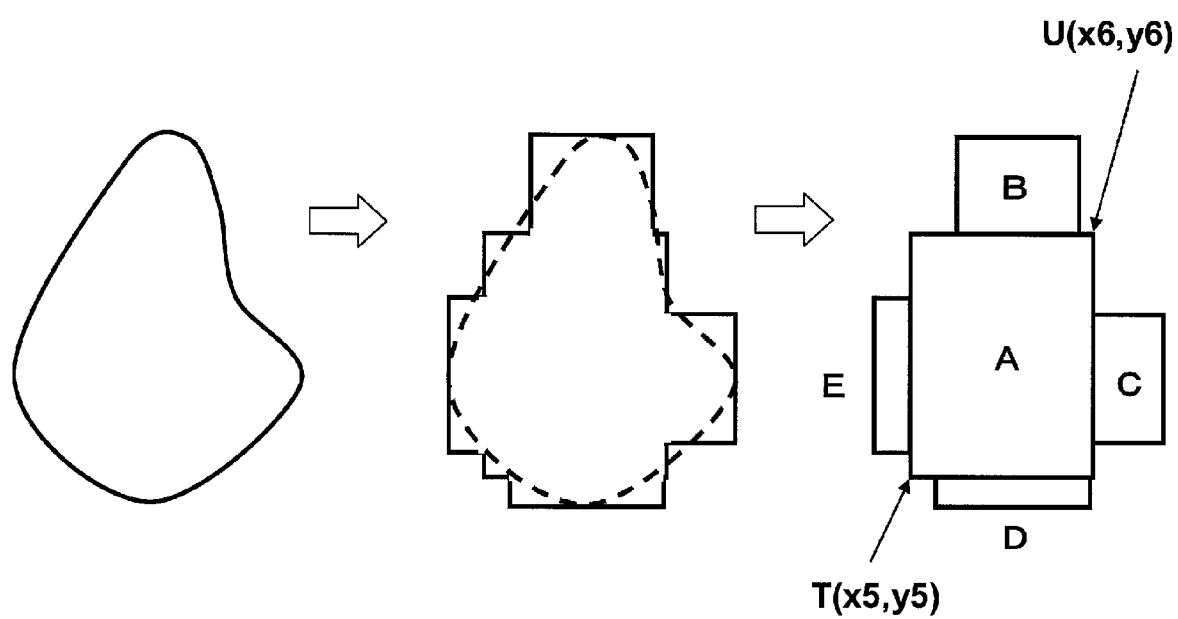
FIG. 9a is a diagram for explaining an example in which a region is approximated by a plurality of rectangles.
Figure 9B:
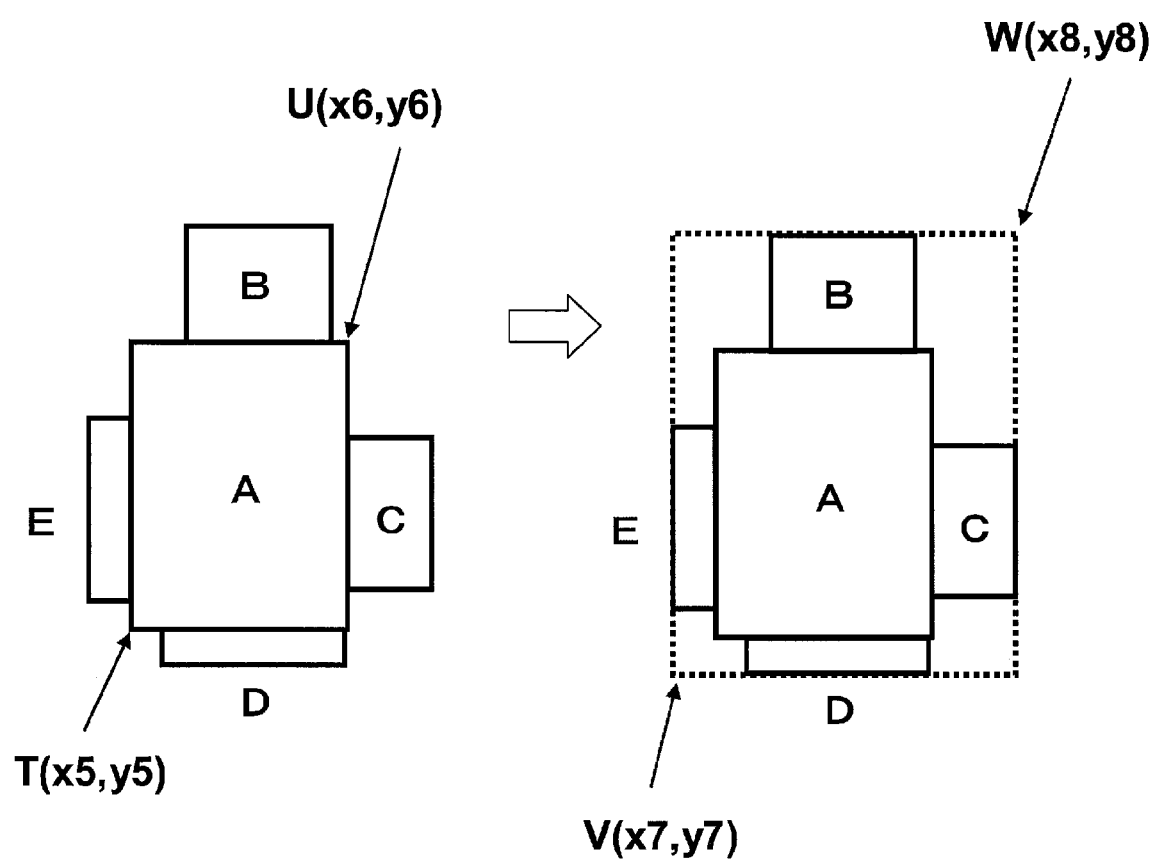
FIG. 9b is a diagram for explaining an example in which a region is approximated by a plurality of rectangles.

The left diagram in FIG. 9b will now be used to explain the foregoing in a two-dimensional plane. The shape shown here is made of five rectangles, the rectangle A through the rectangle E. Thus, these rectangles correspond to I1, I2, . . . , and I5. If the shape A corresponds to I1, then this can be expressed as I1=(I1s, I1E). The coordinates for one corner of the rectangle A can be expressed as I1s=T(x5, y5), and the coordinates of the other corner can be expressed as I1E=U(x6, y6).

Therefore, multiple pieces of rectangle data are included in the rectangle group data designated by the leaf node pointer. The process of determination is performed as to whether or not the user's position is within each of the rectangles in the rectangle group data. In the case where the user's position is within any of the rectangles, the area identifier being stored in that rectangle group data gets returned as a response. In a case where the user is outside the area, the "NULL" response is returned.

An explanation is now given regarding differences from Embodiment 1 in the functional block diagram shown in FIG. 3a.

(1) Area Data Input (Block 220)

The service provider uses a digitizer or a graphical user interface or the like to approximate the shape of the service area (FIG. 9a). In contrast to the case where vectorization is performed, the shape of the service area to be defined is approximated by a combination of multiple rectangles. The size of the rectangles, their positioning, and the like can be set by the service provider as desired.

(2) Area Data Storage (Block 240)

This block stores the data associated with the service area in the area data storage. In this case, the MBR circumscribing all the rectangles used to approximate the shape serves as the MBR data in the index structure. As shown in (Formula 3), that MBR data and the pointer to the rectangle group data are stored in the leaf node of the index structure. As shown in (Formula 4), the rectangle group data designated by that pointer includes a combination of the area identifier, and the rectangle data of the multiple rectangles used to approximate the shape of the corresponding area.

(3) Area Data Retrieval (Block 230)

This block uses the position data to retrieve, from the area data storage, the area identifier corresponding to the position where the user is present. In Embodiment 2, the Guttman search algorithm (non-patent document 6) is executed on the index structure to find the leaf node storing the MBR appropriate for the position data. A determination is then performed on the set of multiple rectangle data included in the rectangle group data designated by the leaf node pointer, to determine whether or not the user's position is within each of the rectangles. In the case where the user is located within any of the rectangles, the area identifier being stored in the rectangle group data (Formula 4) is obtained.

Algorithm

Figure 10A:
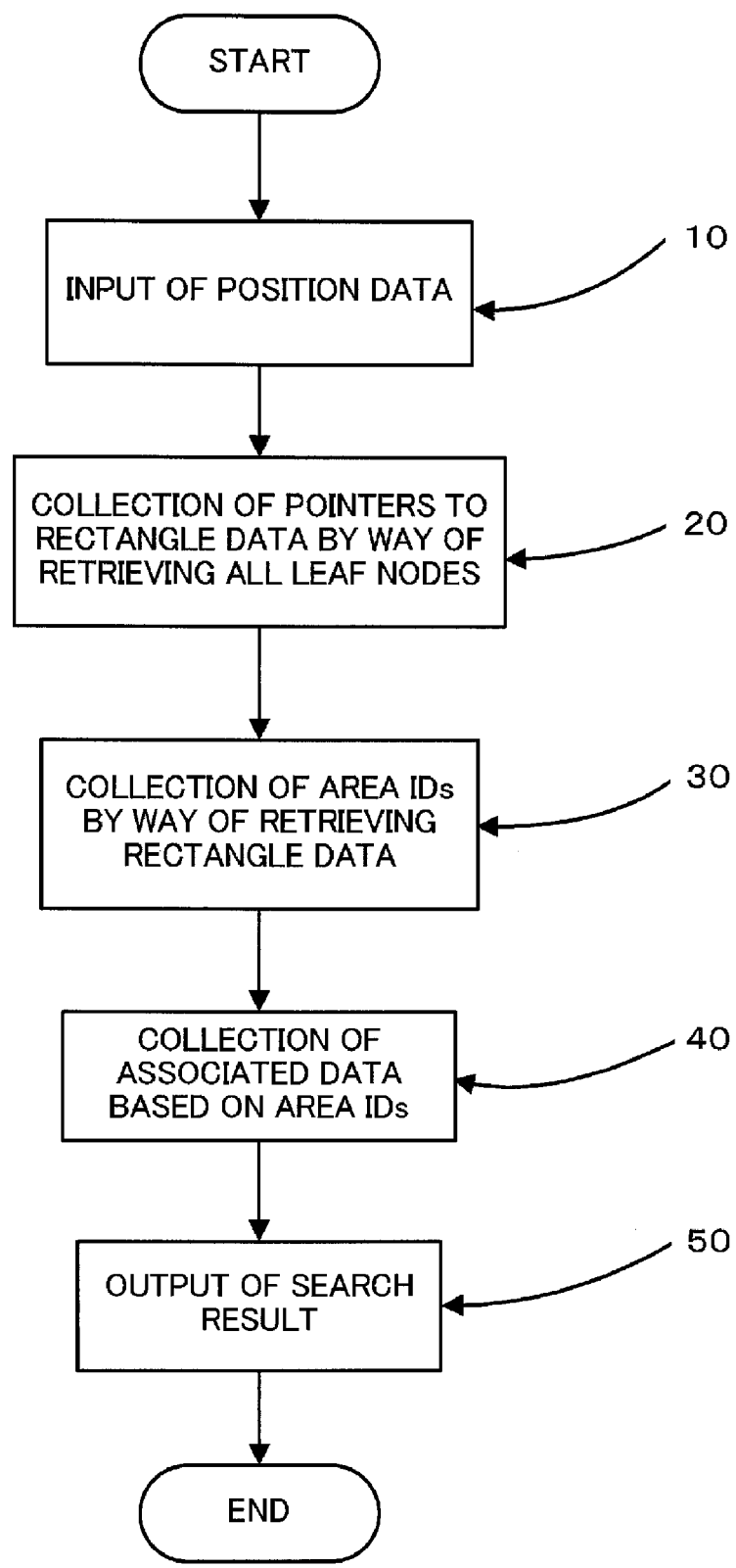
FIG. 10a is a diagram showing a flow diagram of Embodiment 2 of the present invention.

An explanation is now given regarding the algorithm (FIG. 10a) of the method for retrieving the associated data based on the position data according to Embodiment 2.

Step 10: Step of receiving the position data and the user identifier.

The user sends the position data indicating where the user is located and his/her user identifier from his/her data receiver via the network. The area-associated data provision equipment receives these pieces of data.

Step 20: Step of retrieving all the leaf nodes included in the position data.

The Guttman search algorithm is executed on the index structure (FIG. 4a) to retrieve all the leaf nodes storing the MBR data corresponding to the position data received from the user. In the case where the user is located within that MBR, the pointer to the "rectangle group data" is obtained.

Step 30: A determination is performed on all the rectangle data included in the "rectangle group data" designated by the leaf node pointer, to determine whether or not the user's position is inside each of the rectangles. In the case where the user is inside an area designated by the service provider, the area identifier being stored in that rectangle group data is obtained.

Step 40: Step of retrieving the data associated with the area based on the obtained area identifier.

This step is similar to Embodiment 1 with respect to the various data associated with the given area.

Step 50: Step of outputting the retrieval result.

This step includes outputting these data retrieved in Step 40 to the display device on the user's data receiver.

Embodiment 3

In Embodiment 3, an explanation will be given using an example in which "combination of multiple rectangles" is used as the data structure on the service area. The first area data storage stores an "index structure" for individually managing each of the multiple rectangles that approximate the area. The second area data storage is not used.

In Embodiment 3, m number of rectangles approximating the service area are treated as an independent MBR, and the leaf node of the index structure stores data defined for each rectangle as shown in (Formula 5). Using the right side of FIG. 9a as an example, the service area is approximated by five rectangles, the rectangle A through the rectangle E, so five leaf nodes are created to correspond with these.

Leaf node=(I , Area identifier)  (Formula 5)

Here, "I" can be expressed as I=(Is, IE). "Is" represents a coordinate of one corner of the MBR stored in the leaf node. "IE" represents a coordinate of the other corner that is a counterpart of Is in the MBR. In n-dimensional space, Is=(Is=Is$_1$, Is$_2$, . . . , Is$_n$), and IE=(IE$_1$, IE$_2$, . . . , IE$_n$). In two-dimensional space, using the rectangle A on the right side in FIG. 9a as an example, Is=T(x5, y5), and IE=U(x6, y6).

Algorithm

Figure 10B:
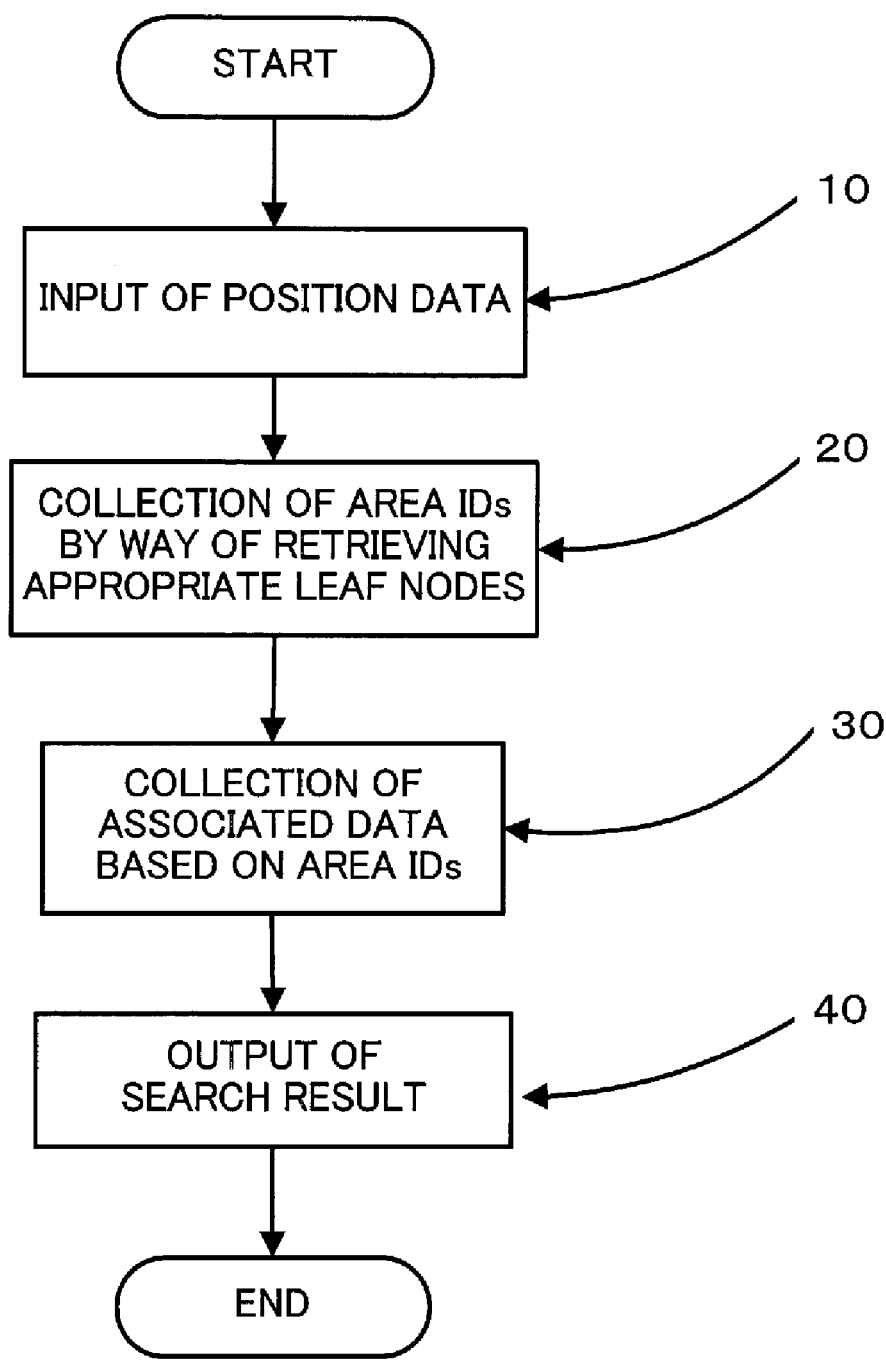
FIG. 10b is a diagram showing a flow diagram of Embodiment 3 of the present invention.

An explanation is now given regarding the algorithm (FIG. 10b) of the method for retrieving the associated data based on the position data according to Embodiment 3.

Step 10: Step of receiving the position data and the user identifier.

The user sends the position data indicating where the user is located and his/her user identifier from his/her data receiver via the network. The area-associated data provision equipment receives these pieces of data.

Step 20: Step of retrieving the leaf node and obtaining the area identifier.

This step executes the Guttman search algorithm on the index structure (FIG. 4a), retrieves the leaf node storing the MBR data that corresponds to the position data, and determines whether or not the user's position is within the rectangle. If it is within the rectangle, the area identifier that is being stored in that leaf node is obtained.

Step 30: Step of retrieving the data associated with the area based on the area identifier thus obtained.

This step is similar to Embodiment 1 with respect to the various data associated with the given area.

Step 40: Step of outputting the retrieval result.

This step includes outputting these data retrieved in Step 30 to the display device on the user's data receiver.

In Embodiment 3, when the user's position is retrieved from the area data storage based on the position data, the Guttman search algorithm is executed on the index structure. When the leaf node storing the MBR corresponding to the position data is found, it becomes possible to determine that the user's position is within the service area, and the area identifier can be obtained immediately.

Embodiment 4

In Embodiment 1, Embodiment 2, and Embodiment 3, the area where the service is provided has been explained as a two-dimensional plane having a certain spatiality. However, in Embodiment 4 and Embodiment 5, explanations will be given by citing examples in which the service area can be approximated not as a two-dimensional area, but as a straight line, or a curved line. In Embodiment 4, an explanation is given regarding a case where the service area can be approximated as a straight line. The first area data storage stores an "index structure," which manages an MBR approximating a particular area as a straight line, and a pointer to that straight line data, as a single pair. Furthermore, the second area data storage stores "straight line data" (Formula 7, described below), which includes the area identifier.

As a preferable embodiment of Embodiment 4, one can consider a case where a user, who is driving a car along a road that can be approximated with a straight line, tries to obtain data such as a service provided to areas including the position where the car is. In such a case, since the user is moving mainly along the road, one understands that the car's position data would frequently be located along a line that is somewhat predictable. The service area would not have to be data of a region having a two-dimensional surface. A definition using straight line data corresponding to the road or the like would suffice for the above-mentioned case. Special shapes for defining the service area would include straight lines, polygonal lines, or curved lines.

Figure 11:
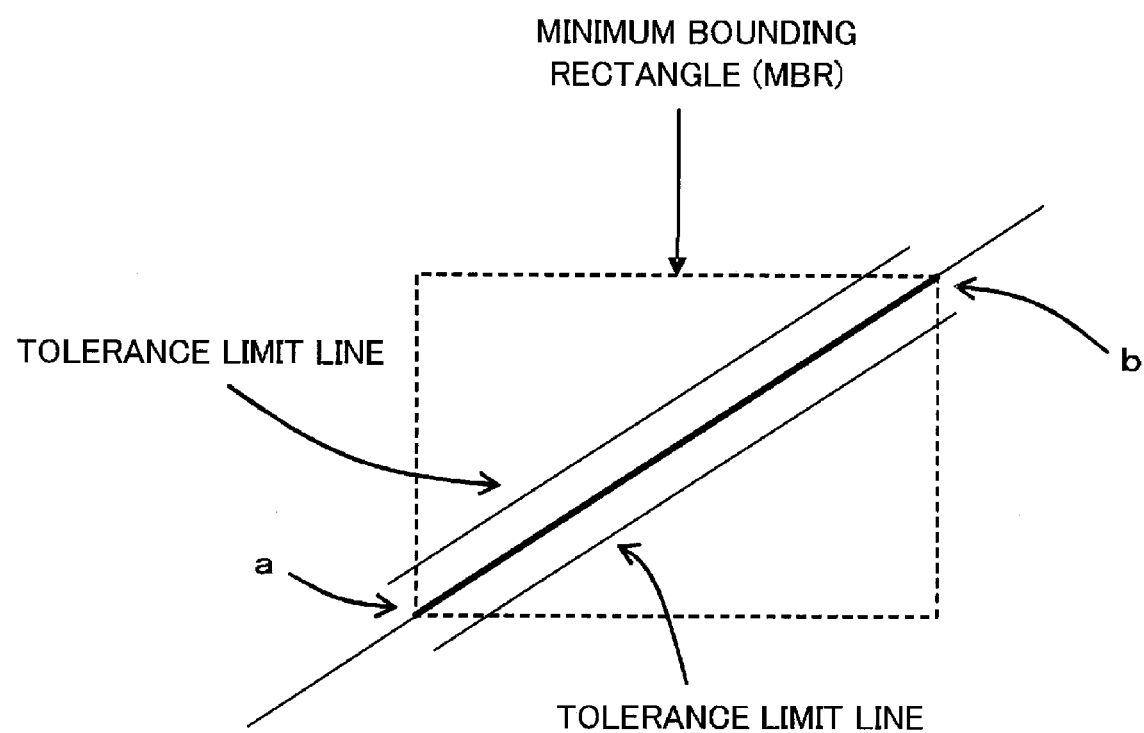
FIG. 11 is a diagram for explaining an embodiment in which an area is approximated by a straight line as a linear region.

FIG. 11 shows an area that can be approximated by a straight line. Even here, as in Embodiment 1, techniques for the minimum bounding rectangle (MBR) can be applied. A straight line connecting a point "a" and a point "b" is determined, and the MBR including the point "a" and the point "b" is defined. In a practical sense, the road has a certain width, and it is necessary to allow a certain margin of error in obtaining the position data, so an error tolerance is defined. The data that is stored in the leaf node is defined using (Formula 6).

Leaf node=(I , Pointer to straight line data)  (Formula 6)

Here, similarly to Embodiment 1, I=(Is, IE), where Is=(Is$_1$, Is$_2$, . . . , Is$_n$), and IE=(IE$_1$, IE$_2$, . . . , IE$_n$). "Is" represents a coordinate of one corner point of the MBR in n-dimensional space. "IE" represents a coordinate of the other corner that is a counterpart of Is in the MBR.

The "straight line data" consists of a combination of data, including data type, a flag, and the area identifier. In Embodiment 4, this is defined using (Formula 7).

Straight line data=(Data type, Flag, Area identifier)  (Formula 7)

Here, "data type" refers to data showing that it is straight line data. "Flag" refers to data indicating whether the angle of the straight line is positive or negative. "Area identifier" refers to an identifier for uniquely identifying the area that is currently being dealt with.

The straight line connecting the points at opposite angles of the MBR can be calculated using the MBR data, the data type, and the flag data provided by (Formula 6) and (Formula 7). Two straight lines are calculated as a function of the angle of the diagonal line being positive and negative, but it is possible to uniquely identify the straight line by designating the angle. Furthermore, if an error tolerance is defined in advance, then it is possible to detect whether the user's position is within the allowable range of that straight line. Accordingly, it can be determined whether or not the user's position is on the linear area where a particular service is provided. If it is within the allowable range, then the area identifier stored in the straight line data designated by the leaf node pointer is obtained, and processing can proceed to the next step.

Figure 12:
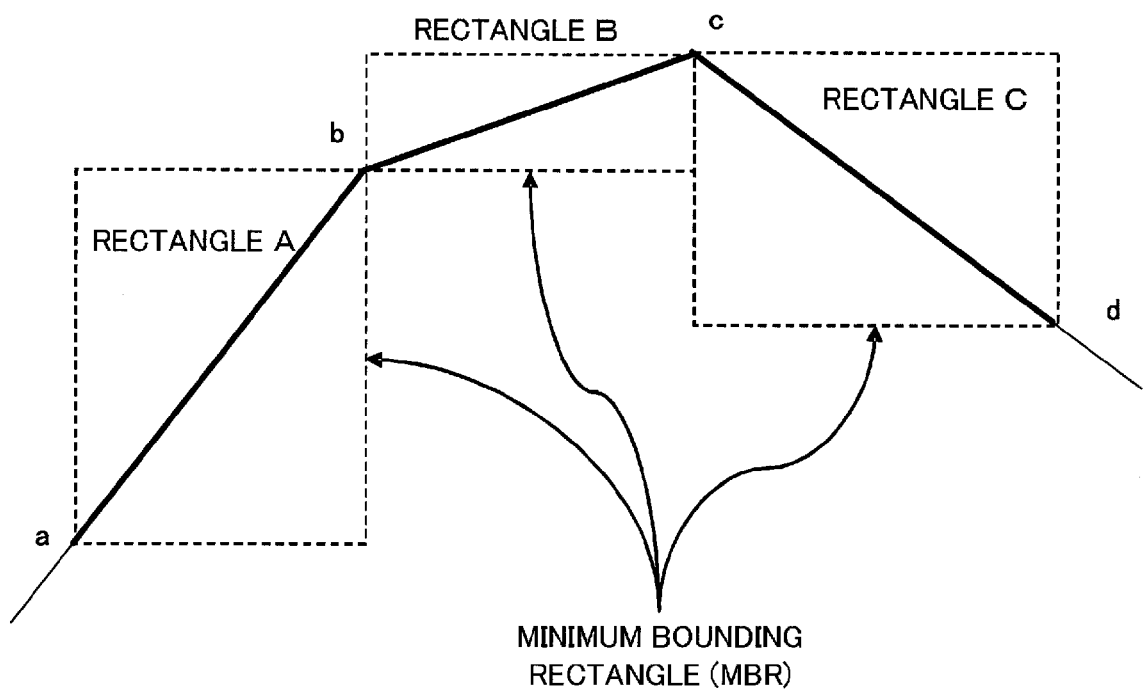
FIG. 12 is a diagram for explaining an embodiment in which an area is approximated by a plurality of straight lines as a nonlinear region.

Next, an explanation is given regarding a case where the service area is approximated by multiple straight lines. In practice, there are many cases where several straight lines are used to approximate the service area on the road, instead of using just one straight line. As shown in FIG. 12, MBRs are applied when performing the approximation with multiple straight lines. In this case, each rectangle defined for each straight line corresponds to each leaf node shown in FIG. 4a. Accordingly, it becomes possible to approximate the entirety of the multiple straight lines which are included in a given region. In order to improve the precision level of the approximation, the number of straight lines needs to be increased, but that requires equivalently more rectangles. In FIG. 12, the approximation is made with a total of three straight lines, from the point "a" to the point "d".

An explanation is now given regarding differences from Embodiment 1 in the functional block diagram shown in FIG. 3a.

(1) Area Data Input (Block 220)

The service provider uses the digitizer or graphical user interface or the like to approximate the service area as straight lines (FIG. 12). The approximation is made with a combination of multiple rectangles that include the service areas defined by the straight lines. The size of the rectangles, their arrangement, and the like can be set as the service provider desires.

(2) Area Data Storage (Block 240)

This block stores the data associated with the service area in the area data storage. In this case, the first area data storage stores an "index structure" which manages the MBRs defined for straight lines that approximate the particular area, and the pointer pointing to each of the straight line data, as a single pair. Furthermore, the second area data storage stores "straight line data," which includes data defining the area approximated by the straight lines, and the area identifiers.

(3) Area Data Retrieval (Block 230)

Based on the position data, the area identifier corresponding to the position where the user is located is retrieved from the area data storage. In Embodiment 4, the Guttman search algorithm is executed on the index structure (non-patent document 6), all the leaf nodes storing the MBR for that position data are retrieved, and the pointer to the straight line data is read out. Next, the MBR data, the data type and flag data which are stored as the straight line data, and tolerance data are used to detect whether or not the user's position is within the allowable range of the straight line in question. Accordingly, it can be determined whether or not the user's position is inside of the area where the particular service is provided. When it is determined that the user is located within the area, the area identifier is obtained, and the processing proceeds to the retrieval of the area-associated data.

Algorithm

Figure 8:
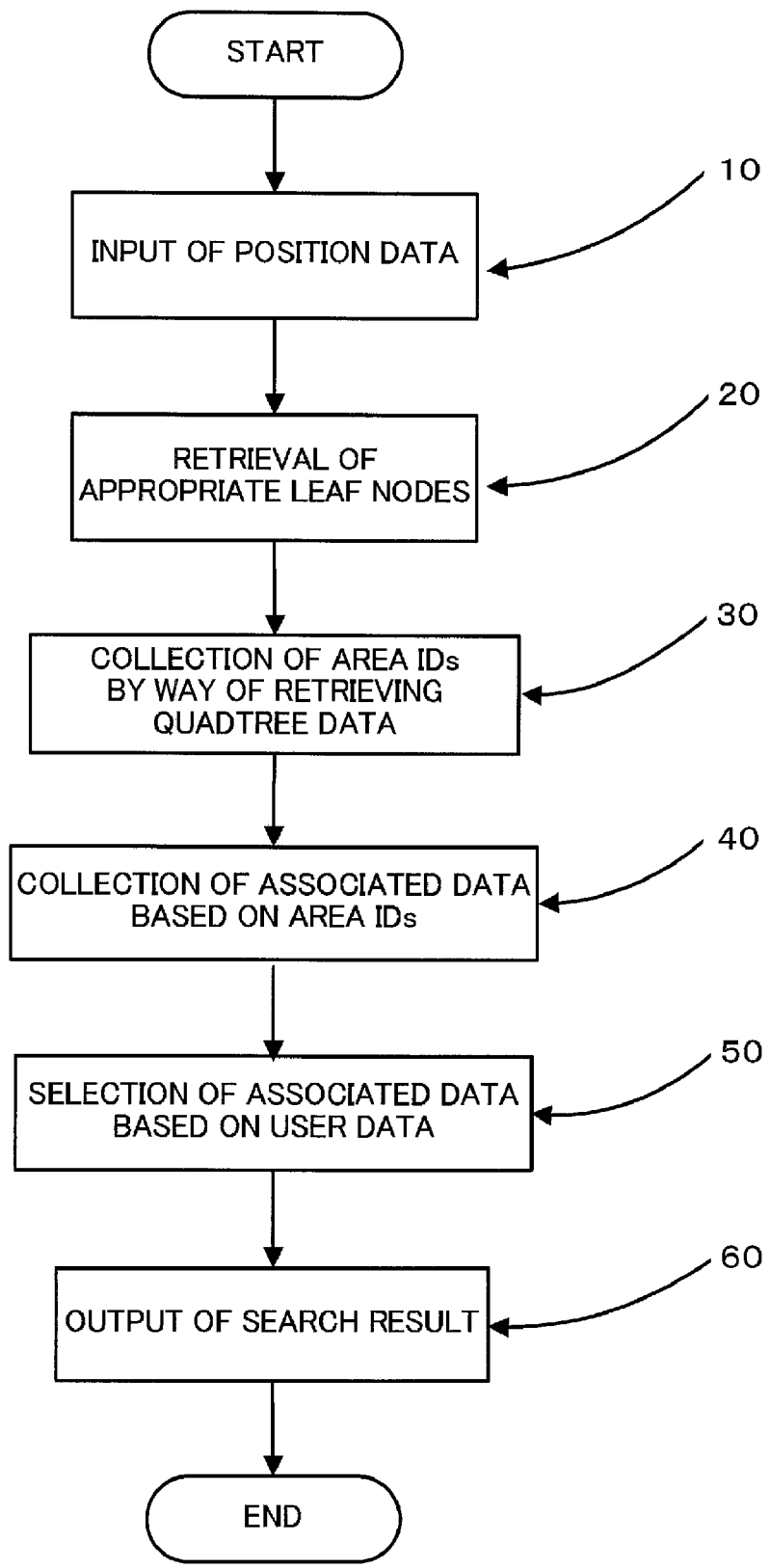
FIG. 8 is a diagram showing a flow diagram of Embodiment 1 of the present invention.

Note that, the algorithm is similar to Embodiment 1 (FIG. 8). Here, in Step 30, a determination is performed as to whether or not the position is located within the approximated straight-line area derived with the "straight line data" designated by the leaf node pointer. In the case where the position is located within the area, the area identifier is obtained.

Embodiment 5

In Embodiment 5, an explanation is now given regarding a case where the service area can be approximated with a curved line. The first area data storage stores an "index structure" which manages an MBR defined for a curved line which approximates a particular area, and data including a pointer to that curved line data, as a single pair. Furthermore, the second area data storage stores "curved line data" (Formula 9, described below) which includes the area identifier.

In actual management of area data, there are cases where the approximation must be performed with curved lines, not straight lines. One method of approximating a curved linear area is a method where the curved line is divided into a given number of sections, and each section is represented by straight lines. In other words, this is a method where a curved line is approximated with polygonal lines. In this case, the method described in Embodiment 4 is applied to the MBRs defined for each of the straight lines, whereby the curved-linear area can be approximated.

Hereinafter, an explanation is given regarding another method in which the curved-linear area is not approximated with polygonal lines, but is approximated with a curved line. Various types of methods are known as methods for approximating a curved line that passes through all the points on a curved-linear area. Spline interpolation is a special form of approximation where the interpolant is a piecewise polynomial called spline. That is, the spacing of the data can be approximated by a particular function. Generally, the curved line can be approximated by the coordinates of two points, and a particular coefficient.

Figure 13:
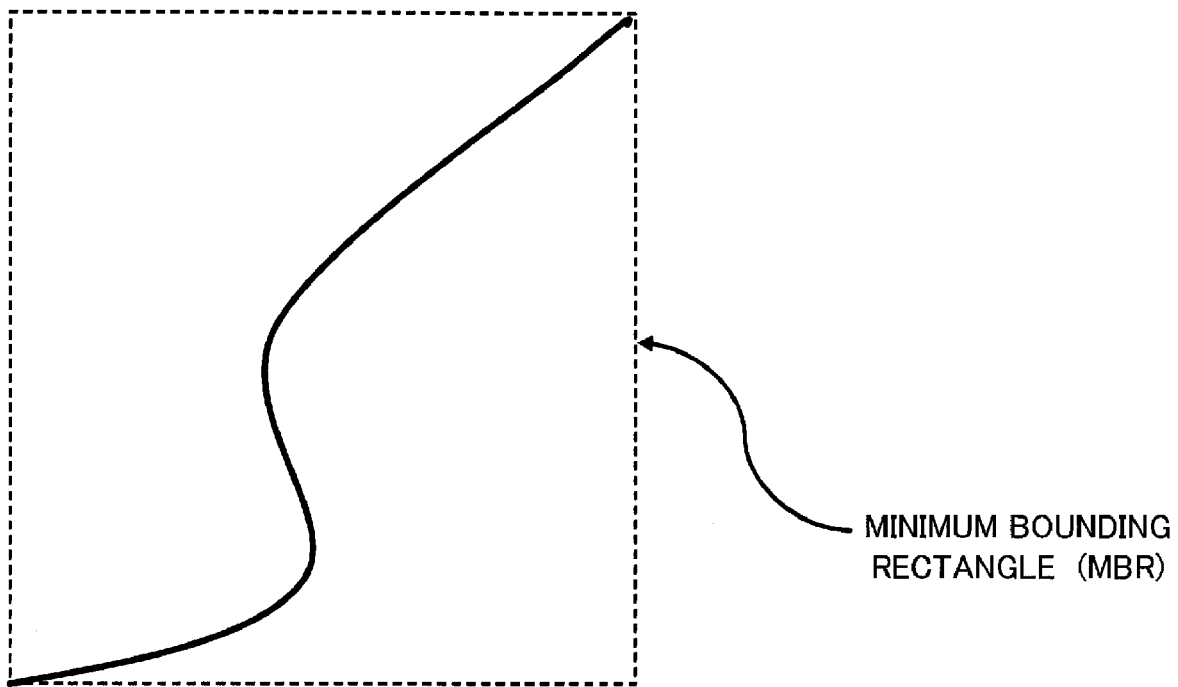
FIG. 13 is a diagram for explaining an embodiment in which an area is approximated as a curved line region.

An explanation is now given regarding a method for approximating by spline function interpolation, in a case of approximating the curved line shown in FIG. 13.

(1) Divide the given curved line into a particular number of intervals.

(2) Derive the coefficient of the spline function for each interval.

(3) Approximate the curve of the entire interval with the coordinates of each division point, and the coefficient derived in (2).

Here, the leaf node corresponding to the MBR of the curved line to be approximated is defined in (Formula 8).

$$\text{Leaf node} = (I, \text{Curved line data pointer}) \qquad \text{(Formula 8)}$$

Here, similarly to Embodiment 1, $I=(I_S, I_E)$, where $I_S=(I_{S_1}, I_{S_2}, \ldots, I_{S_n})$, and $I_E=(I_{E_1}, I_{E_2}, \ldots, I_{E_n})$. "$I_S$" represents a coordinate of one corner point of an MBR in n-dimensional space. "$I_E$" represents a coordinate of the other corner point which is a counterpart of $I_S$ in the MBR.

The "curved line data" consists of a combination of data including the data type, coefficient, and area identifier. In Embodiment 5, this is defined as shown in (Formula 9).

$$\text{Curved line data} = (\text{Data type, Coefficient, Area identifier}) \qquad \text{(Formula 9)}$$

Here, "data type" refers to data showing that the data is curved line data. "Coefficient" refers to spline interpolation coefficient. "Area identifier" refers to an identifier for uniquely identifying the area that is currently being dealt with.

The curved line passing through the points at opposite angles of the MBR is uniquely identified by a calculation using the MBR data, the data type, and the coefficient data obtained using (Formula 8) and (Formula 9). Furthermore, if the error tolerance is determined in advance, then it can be detected whether or not the user's position is within the allowable range of that curved line. Accordingly, it can be determined whether or not the user's position is in the area where a particular service is provided. If the position is within the allowable range, then the area identifier being stored in the curved line data designated by the leaf node is obtained, and the process can proceed to the retrieval of the area-associated data.

Figure 14:
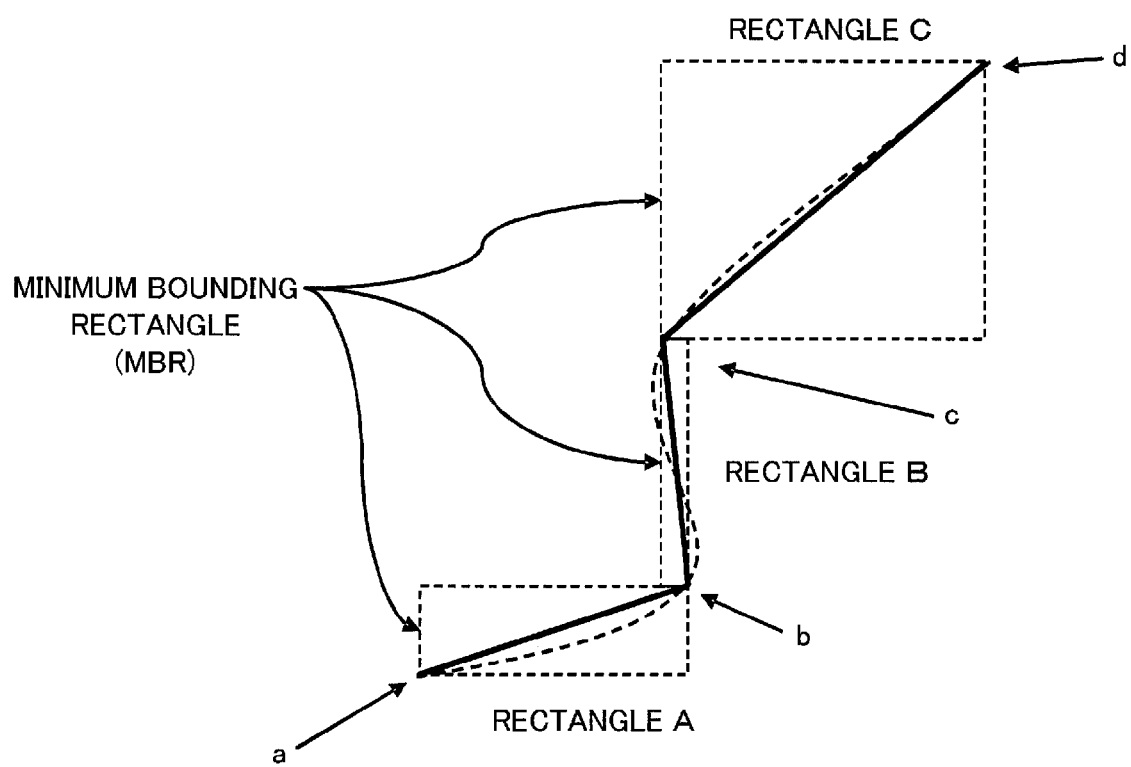
FIG. 14 is a diagram for explaining an embodiment in which an area is approximated by a plurality of curved lines as a curved line region.

In practice, in order to approximate a service area on a road, there are many cases where not one curved line, but several curved lines are combined. As shown in FIG. 14, multiple MBRs are applied to a case of approximating multiple curved lines. In this case, each rectangle defined for each interval of the curved line corresponds to each leaf node shown in FIG. 4a.

Accordingly, one of the MBRs representing an interval of the curved line corresponds to a leaf node. Thus, the entire curved line included in a given region can be approximated. In order to improve the precision level of the approximation, more divisions need to be made in the curved line, but equivalently more rectangles will become necessary. In FIG. 14, the entire curved line is approximated by a total of three curved lines from a point "a" to a point "d".

An explanation is now given regarding differences from Embodiment 1, in the functional block diagram shown in FIG. 3a.

(1) Area Data Input (Block 220)

The service provider uses the digitizer or the graphical user interface or the like to divide the service area, which is defined by a courved line, into a particular number of intervals (FIG. 14). Next, the MBRs containing the intervals of the curved line are defined. The curved line within each MBR is approximated by the coordinates of the points at opposite angles of the MBR, and the given coefficient of each interval. The division of the curved line, the size of the rectangles, their arrangement, and the like, can be set by the service provider as desired.

(2) Area Data Storage (Block 240)

This block stores the data associated with the service area in the area data storage. In this case, the first area data storage stores an "index structure" which manages the MBRs that are defined for the curved line approximating the particular area, and the pointer pointing to the curved line data, as a single pair. Furthermore, the second area data storage stores "curved line data," which includes the area identifiers.

(3) Area Data Retrieval (Block 230)

Based on the position data, the area identifier corresponding to the position where the user is located is retrieved from the area data storage. In Embodiment 5, the Guttman search algorithm is executed on the index structure (non-patent document 6), and all the leaf nodes storing the MBR for that position data are retrieved, and the pointer to the curved line data is read out. Next, the MBR data, the data type and coefficient which are stored as the curved line data, and tolerance data are used to detect whether or not the user's position is within the allowable range of the curved line in question. Accordingly, it can be determined whether or not the user's position is inside of the area where the particular service is provided. When it is determined that the user is located within the area, the area identifier is obtained, and the processing proceeds to the retrieval of the area-associated data.

Algorithm

Note that the algorithm is similar to Embodiment 1 (FIG. 8). Here, in step 30, a determination is performed as to whether or not the position is within the approximated curved-line area derived with the "curved line data" designated by the leaf node pointer. In the case where the position is within the area, the area identifier is obtained.

Embodiment 6

(1) Constitution of a Multi-Stage Index Structure:

In the explanations of Embodiments 1 to 5, the area data storage (240) includes the single index structure, i.e., the first area data storage and the second area data storage.

In Embodiment 6 of the present invention, a data structure will be further described that is constructed by hierarchically arranging or linking the above-mentioned index trees.

For simplification of explanation, a two-stage index tree will be explained. However, the present invention is also applicable to a multi-stage index structure.

Figure 15:
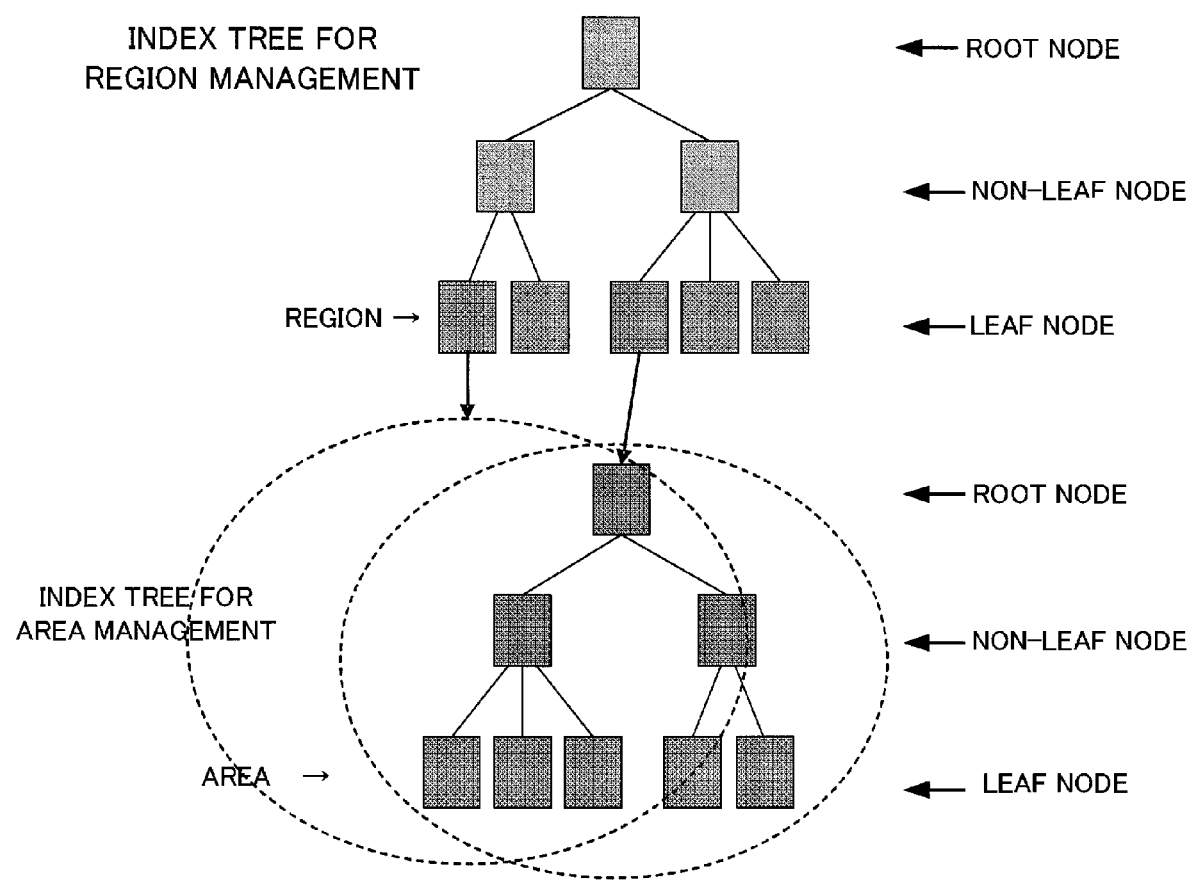
FIG. 15 is a diagram showing a multi-stage index structure of the present invention.

As shown in FIG. 15, it is possible to construct an R*-tree structure including a root node, non-leaf nodes, and leaf nodes at both a first stage and a second stage.

The root node at the second stage is designated by a pointer stored in the leaf nodes of the first stage.

Hereinafter, in Embodiment 6, the first stage and the second stage of the two-stage index tree will be respectively called index for region and area management, for descriptive purposes.

(2) Index Tree Based on Area Attribute Information (Attribute-Based Index Tree):

In Embodiment 6, an index tree based on area attribute information is disclosed.

It is possible to perform easy and prompt search corresponding to a purpose by paying attention to attributes allocated to each area and constructing an index tree for a set of areas having a specific attribute value.

Data such as a registrant of each area, a service provider in the area, and a type of a service are attributes.

As specific attribute values, for example, there are a predetermined restaurant and a predetermined movie theater. On the other hand, the index tree explained in Embodiments 1 to 5 is an index tree based on geographical position data.

To distinguish between those index trees, in the following description, an index tree that is constructed based on geographical position data will be called "position-based index tree" and an index tree constructed based on area attributes will be called "attribute-based index tree."

Therefore, the position-based index tree includes a "position-based index tree for region management" and a "position-based index tree for area management", and the attribute-based index tree includes an "attribute-based index tree for region management" and an "attribute-based index tree for area management".

Figure 20:
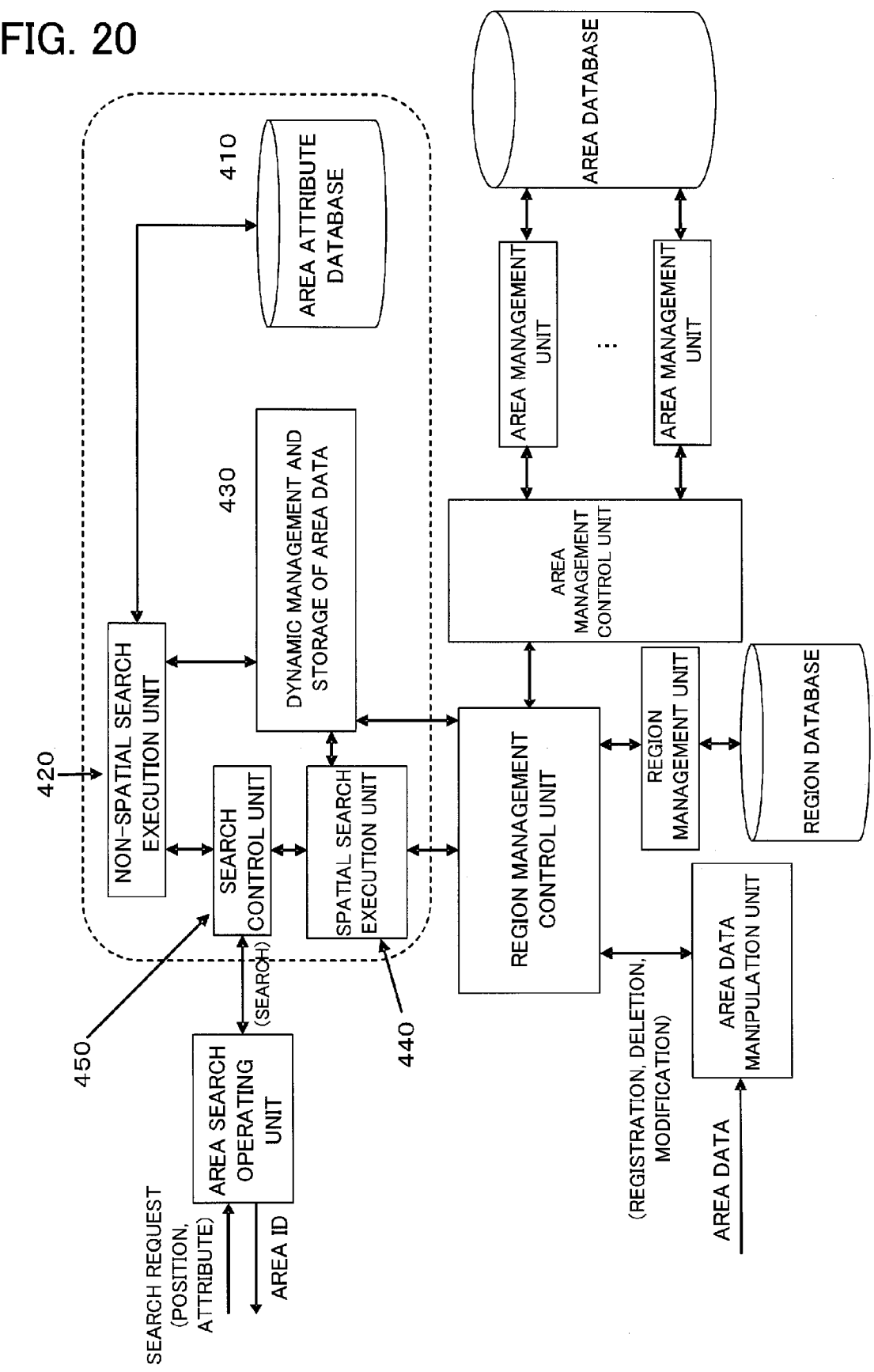
FIG. 20 is a block diagram of an embodiment of the present invention.

In an area attribute database (410) of FIG. 20, area attribute information (attribute type, attribute value, and so on) is stored.

(3) Spatial Resolutions in Respective Regions:

It is possible to set spatial resolutions in respective regions independently from one another.

Herewith, in cases where different degrees of information density are needed in different regions, it allows an improved efficiency of memory use by adjusting the spatial resolution of local coordinate system for defining areas, and it also simplifies the management of those areas.

Figure 21:
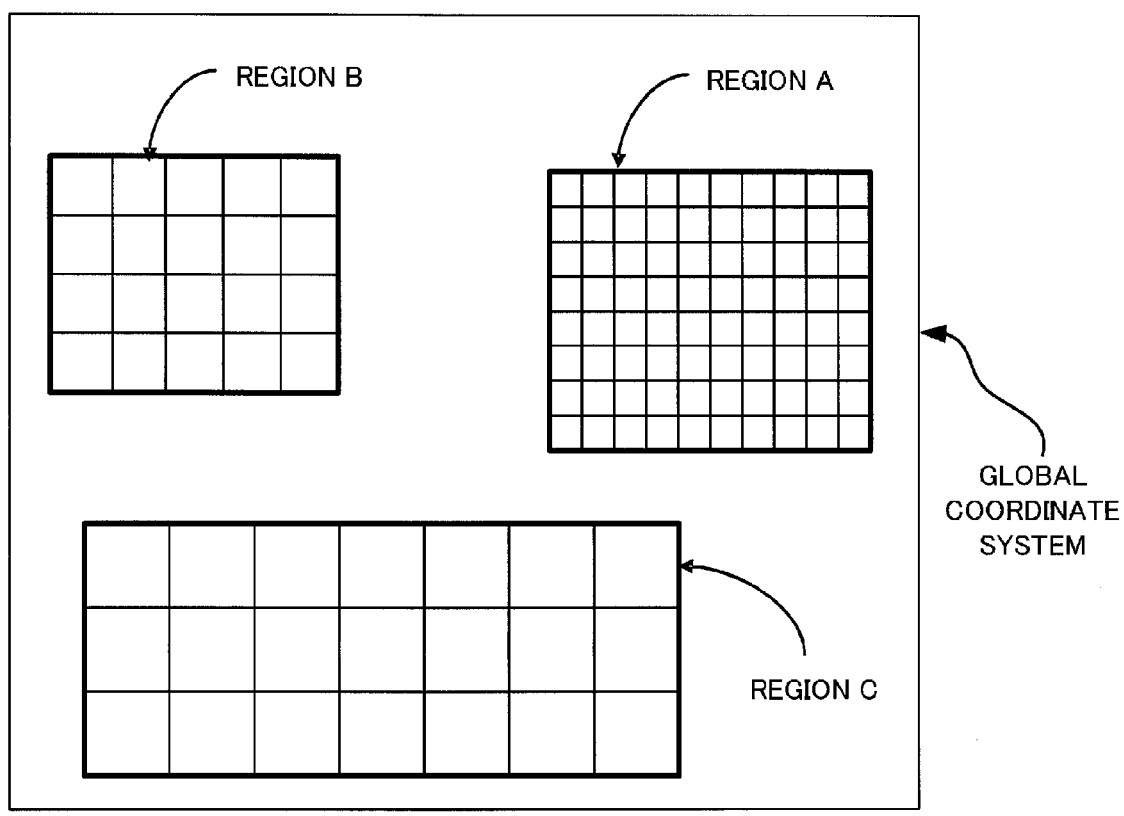
FIG. 21 is a diagram indicating that it is possible to change a granularity of an area in an embodiment of the present invention.

As shown in FIG. 21, it is possible to set a region A, a region C, and a region B as a region in which area definition is performed with fine resolution, a region in which area definition is performed with rough resolution, and a region in which area definition is performed with resolution of an intermediate degree, respectively.

As an example, a waste in terms of memory management may be incurred when area management for a metropolis crowded with object areas and area management for suburbs where object areas dispersed are realized as regions having the same spatial resolution.

Thus, spatial resolution in regions where the area management for suburbs is performed is set rough.

(4) Expansion of a Registered Region:

A range of an area may be expanded exceeding a range defined at the time of formation of an index tree.

For example, an area may be expanded because of expansion of a shopping mall, merger of cities, towns, and villages, and the like.

Moreover, it is also conceivable that an area is registered anew exceeding an initial region.

In this case, it is necessary to change not only an index tree for area management but also an index tree for region management that manages a region containing the area.

This will be explained with reference to FIGS. 22 and 23.

Figure 22A:
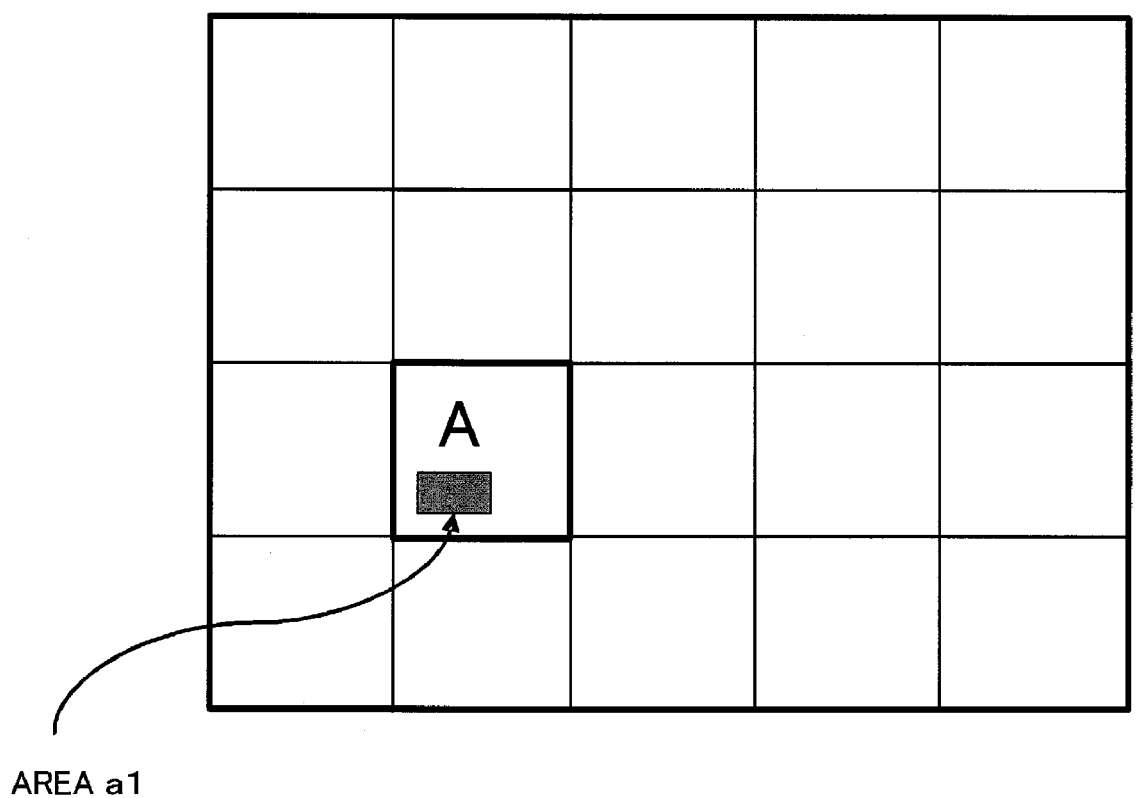
FIG. 22a is a diagram showing an area setting of an embodiment of the present invention.

It is assumed that, as an initial state, an area a1 is defined (registered) in a region A shown in FIG. 22a.

Figure 22B:
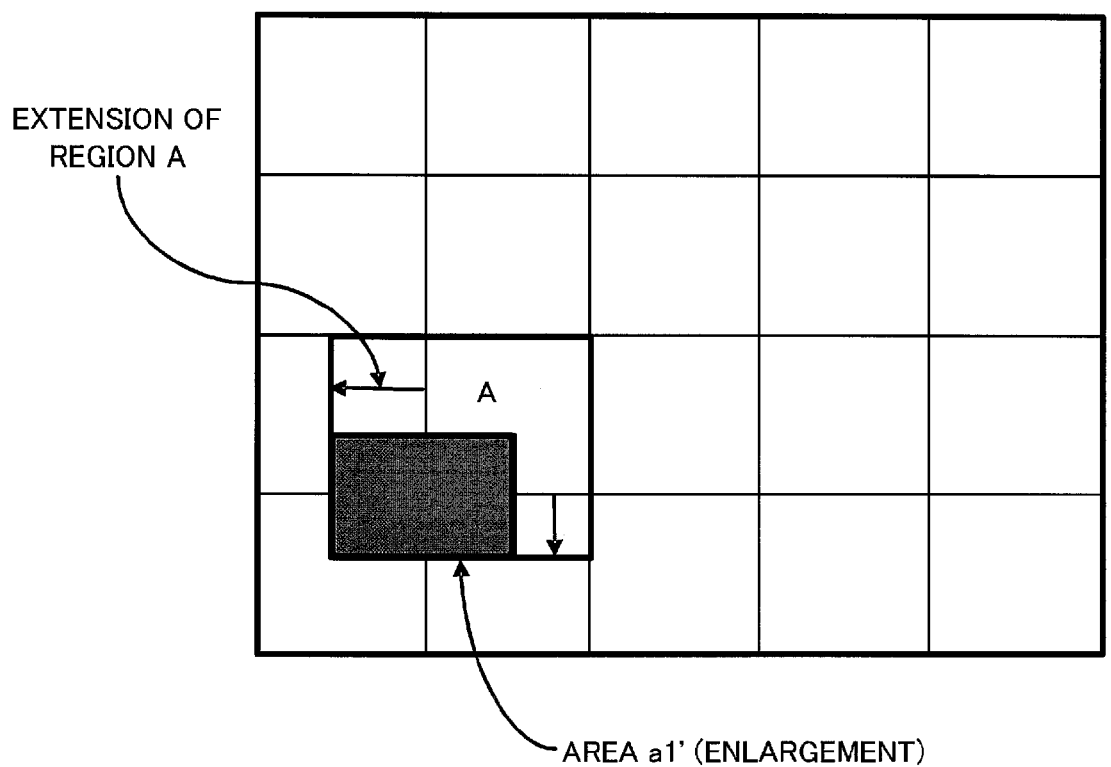
FIG. 22b is a diagram showing an example in which a region is expanded of an embodiment of the present invention.

After that, as shown in FIG. 22b, when the area a1 contained in the region A is enlarged exceeding a range of the region A, the region A is expanded to contain an area a1' after enlargement. In this case, MBR data included in a leaf node corresponding to the region A among leaf nodes of an R*-tree structure of a first stage is changed, and a node corresponding to the area a1 in an R*-tree structure of a second stage is changed.

New registration of an area will be explained.

Figure 23:
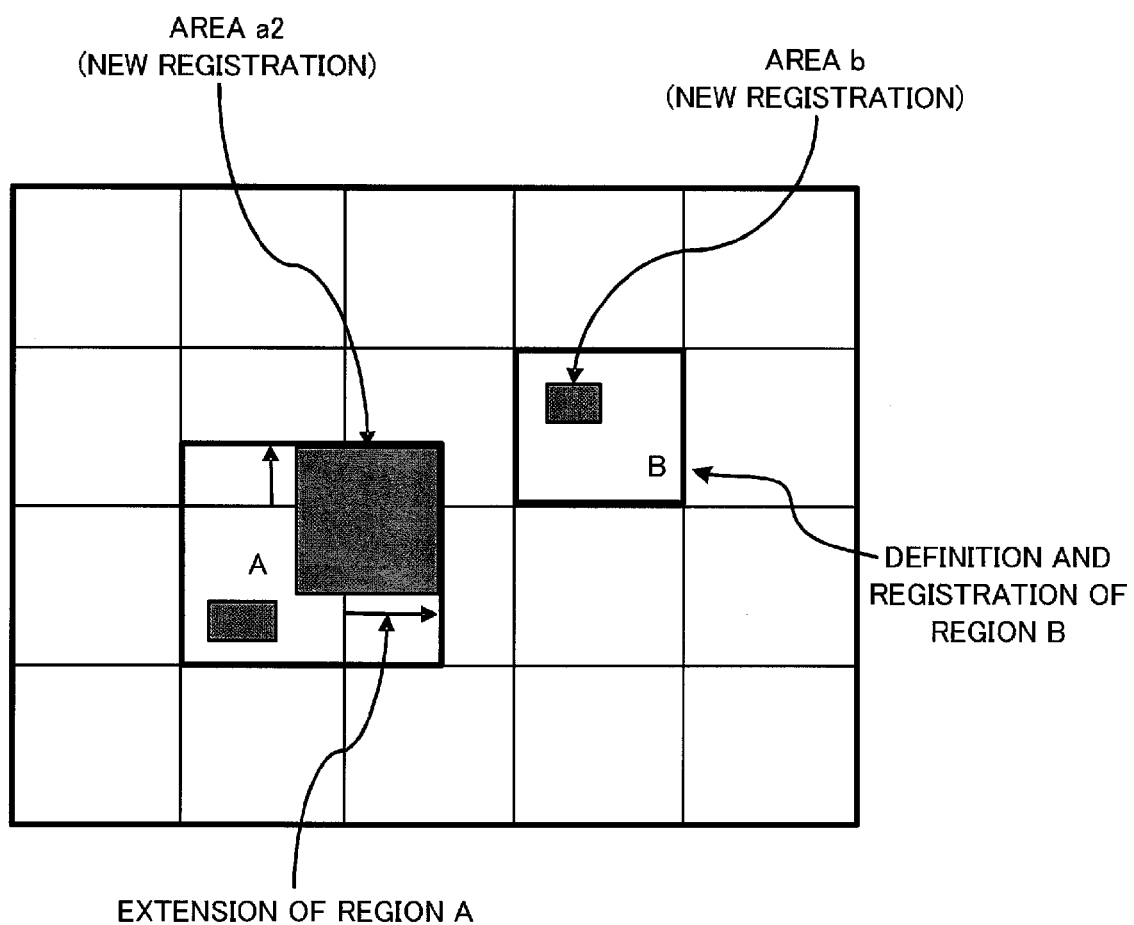
FIG. 23 is a diagram showing an example in which a region is expanded of an embodiment of the present invention.

As shown in FIG. 23, when an area a2 to be registered is not fit in the region A, the region is expanded to contain the area.

In this case, in the same manner as described above, MBR data included in a leaf node corresponding to the region A among the leaf nodes of the R*-tree structure of the first stage is changed, and a node corresponding to the area a2 in the R*-tree structure of the second stage is added.

When an area b is registered anew in a location undefined as a region, as shown in FIG. 23, a region B is defined as a new region and nodes corresponding to the R*-tree structures of the first stage and the second stage are added.

Figure 24:
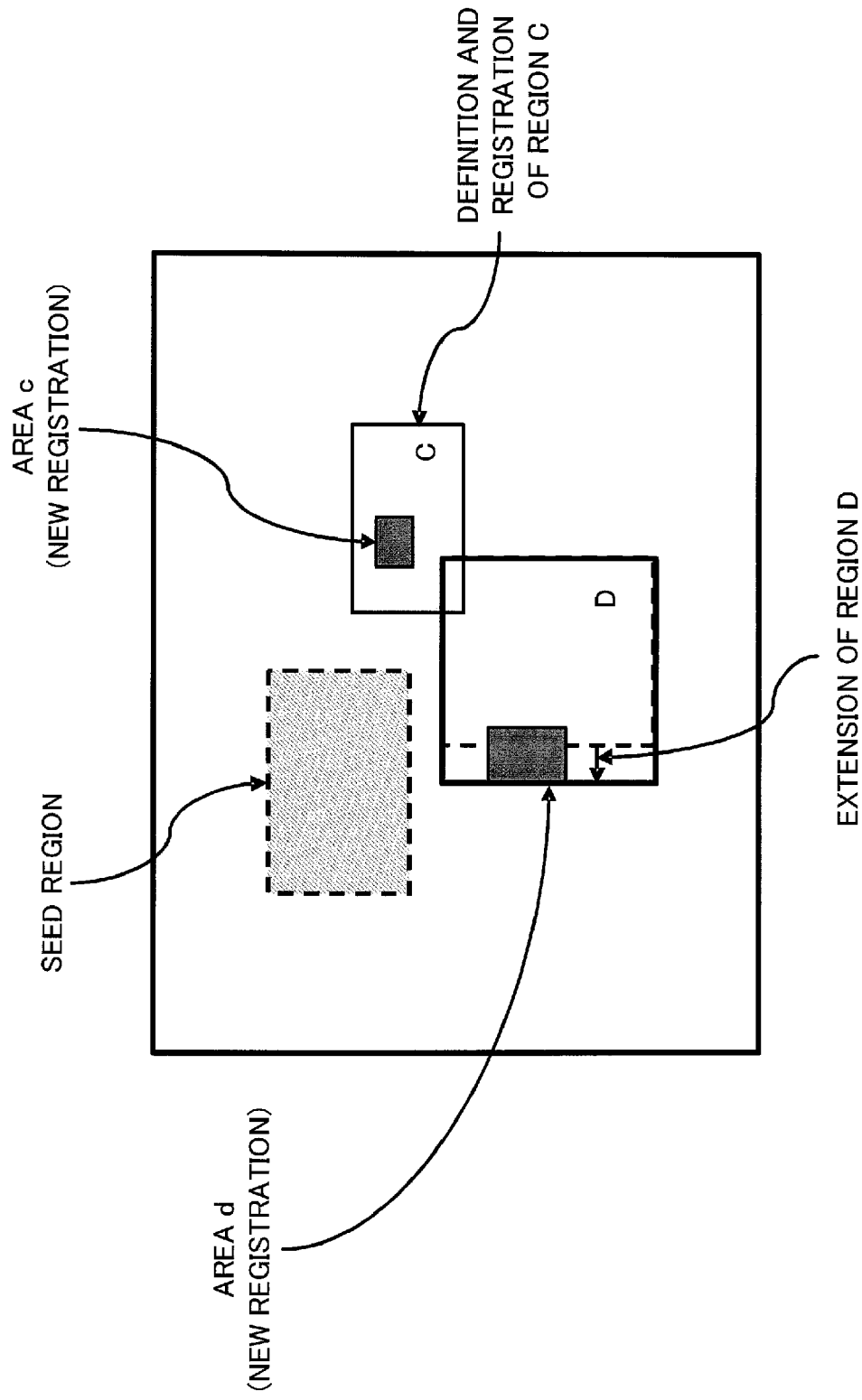
FIG. 24 is a diagram showing an example in which a seed region is expanded of an embodiment of the present invention.

Another method of setting a region is shown in FIG. 24.

In this method, a system administrator or a service provider sets an initial region (hereinafter referred to as "seed region") in advance taking into account a geographical factor and the like. When an area is registered to be fit in the seed region, the same processing as the above description is performed.

When an area c is registered outside the seed region, a new region C is defined and registered.

When an area d to be registered is not fit in a seed region D, the region is expanded.

Figure 19:
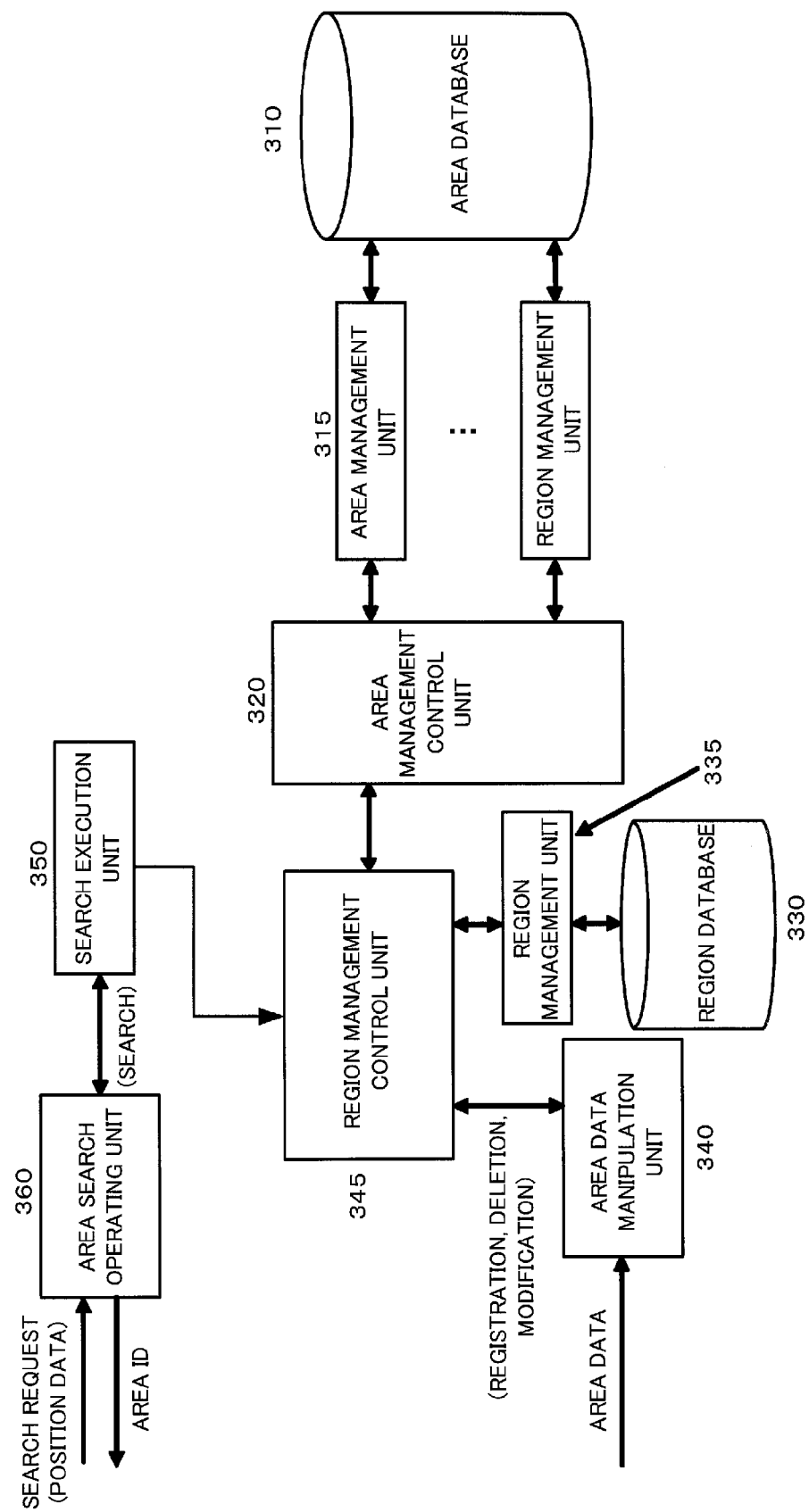
FIG. 19 is a block diagram of an embodiment of the present invention.

(5) System Diagram:

FIG. 19 shows a system diagram of an area management system according to Embodiment 6.

In an area database (310), data such as shapes and positions defining respective areas and identifiers of the areas are stored.

An area management unit (315) manages of the area database (310). An area management control unit (320) manages the area management unit and indirectly controls the area database (310).

In a region database (330), data defining a region in a wider range containing a plurality of areas and an identifier of the region are stored.

A region management unit (335) manages the region database (330). A region management control unit (345) manages the region management unit and indirectly controls the region database (330).

In an area data manipulation unit (340), the service provider or the system administrator performs input in registering, deleting, or changing contents of the area database (310) or the region database (330).

A user inputs position data through an area search operating unit (360) and obtains an area identifier as a search result. A search execution unit (350) executes an actual search.

In FIG. 20, a system configuration part for performing a search and the like taking into account area attributes is shown in an inner side of a broken line portion.

In an area attribute database (410), data not including position data is stored. A non-spatial search execution unit (420) performs a search based on area attributes without using position data.

Area data is temporarily stored in a unit for dynamic management and storage of area data (430).

After the search based on area attributes, a spatial search execution unit (440) performs a search concerning position data for respective items found from the area attributes.

A search control unit (450) controls the spatial search execution unit (410) and the non-spatial search execution unit (420).

(6) Algorithm:

First, a processing for the case in which area attributes are not used will be explained. Then, a processing for the case in which area attributes are used will be explained.

1. Case in which Area Attributes are not Used:

(a) Region/Area Registration Algorithm:

A processing flow for the case in which area attributes are not used and the service provider registers an "area" anew in a position-based index tree will be explained.

Registration of a region is performed according to prior setting by the system administrator or automatic setting/registration (region expansion processing) by the system.

Figure 25:
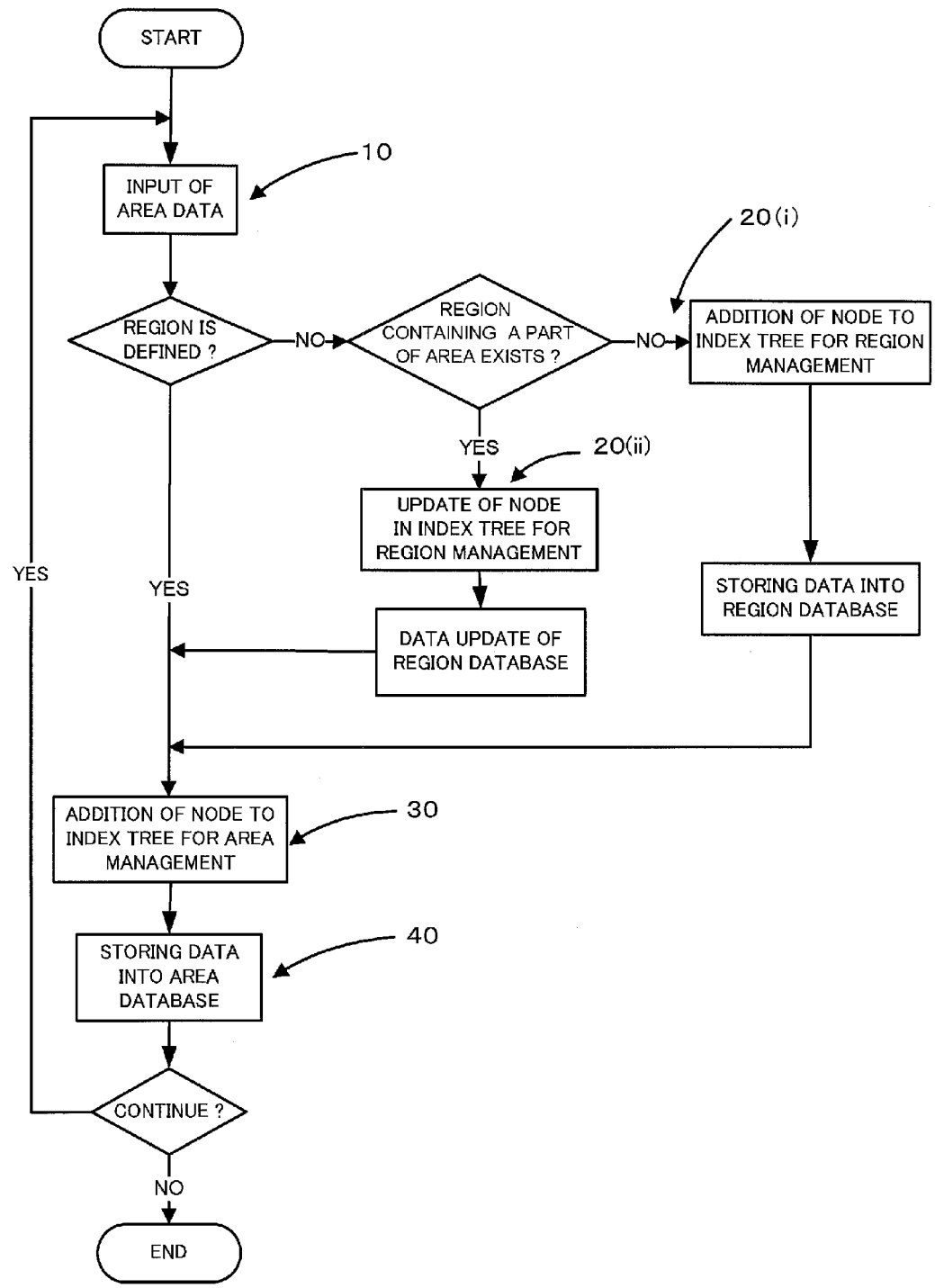
FIG. 25 is a flowchart concerning an embodiment of the present invention.

Consequently, construction or update of the position-based index tree is performed (FIG. 25).

10: Input of area data to be registered:

The service provider inputs area data such as position data, shape, and the like to be registered.

20: Registration of a region containing an area:

When a "region" containing the "area" is registered, the system shifts to Step 30.

(i) When a "region" containing the "area" is not registered, the system sets and registers a "region" corresponding to the area anew. The system adds a node to an index tree for region management.

(ii) When a "region" containing only a part of the "area" is registered, the system performs "expansion of the region" to contain the area in a region corresponding thereto. At the same time, the system updates node data of the index tree for region management.

30: Addition of a node to the index tree for area management:

The system adds a corresponding node to an index tree for area management.

40: Storage of area data:

The system stores area data in the area database (FIG. 19, 310).

Figure 26:
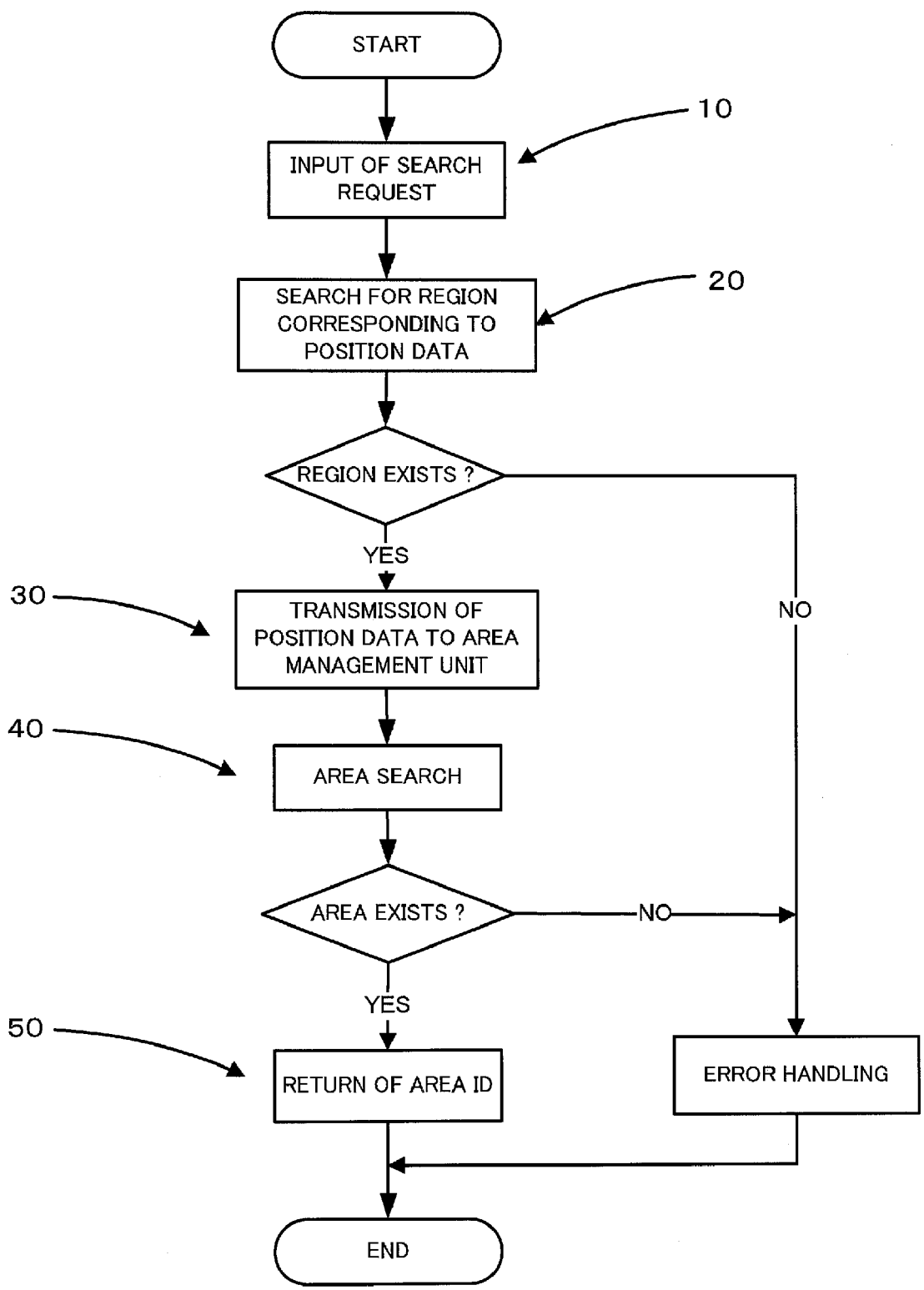
FIG. 26 is a flowchart concerning an embodiment of the present invention.

(b) Area Search Algorithm:

An algorithm for searching for, when area attributes are not used but a service user inputs position data, a service and the like available in the position using a position-based index tree will be explained (FIG. 26).

10: Input of a search request (position data) by the user:

The service user inputs data of a position where the service user is located at present.

20: Search for a region corresponding to the position data:

The system traverses the index tree for region management and searches a "region" corresponding to the position data. When a region corresponding to the position data is found, the system shifts to Step 30. When there is no region corresponding to the position data, the system finishes the search processing.

30: Transmission of position data to an area management unit corresponding to the "region" found:

When the corresponding region is found, the system transmits the position data to an area management unit corresponding to the region found.

40: Search through the index tree for area management:

The system performs an area search using the index tree for area management based on spatial coordinate resolution used for area definition in the area management unit.

50: Returning an area identifier found.

Figure 27:
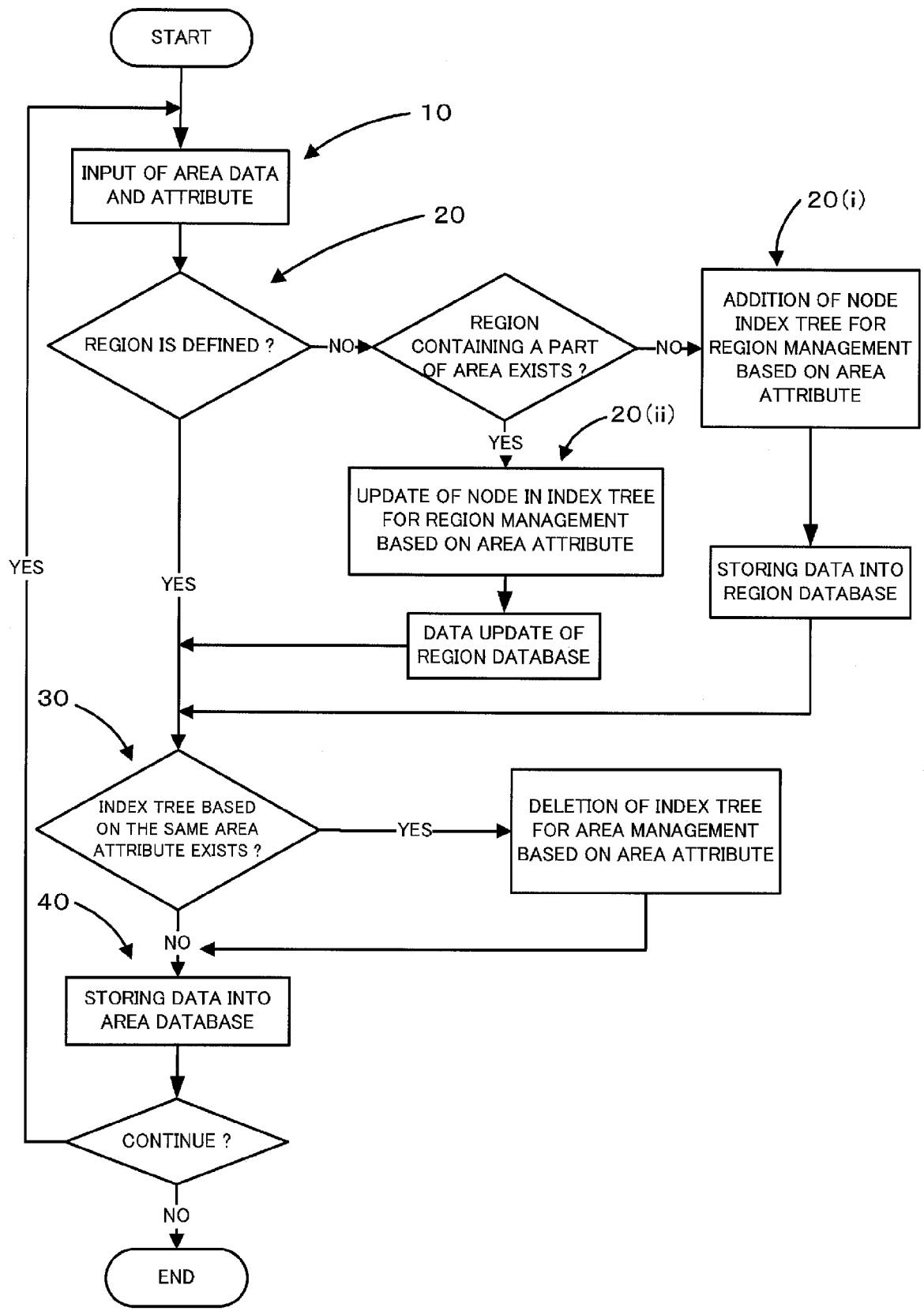
FIG. 27 is a flowchart concerning an embodiment of the present invention.

2. Case in which Area Attributes are Used:

As area attributes, there are a specific restaurant name, a specific movie theater name, and the like. An embodiment in which those area attributes are used will be explained (FIG. 27).

(a) Region/Area Registration Algorithm:

A processing flow for the case in which area attributes are used and the service provider registers an area a new will be explained.

10: Input of area data to be registered and attribute information of the area:

The service provider inputs area data such as position data and a shape to be registered and attribute information of the area.

20: Registration of a region containing the area:

When a "region" containing the "area" is registered, the system shifts to Step 30.

(i) When a "region" containing the "area" is not registered, the system sets and registers a "region" corresponding to the "area" anew. The system adds anode to the index tree for region management.

(ii) When a "region" containing only a part of the "area" is registered, the system performs "expansion of the region" to contain the area in a region corresponding to the area. At the same time, the system updates node data of an index tree for region management based on area attributes.

30: Deletion of an index tree based on the same area attributes:

When an index tree for area management based on area attributes same as designated area attributes is present, the system deletes the index tree for area management based on area attributes.

When the index tree for area management based on area attributes is present, it is possible to quickly perform a search. However, when data of the index tree for area management based on area attributes is updated, since the index tree for area management based on area attributes before the update does not reflect latest data, it is impossible to use the index tree for area management based on area attributes. Thus, it is necessary to delete the index tree for area management based on area attributes.

40: Storage of area data:

The system stores area data in the area database (FIG. 19, 310).

(b) Area Search Algorithm:

An algorithm in which the service user uses area attributes and position data and searches for a service and the like available in the position will be explained. As the area attributes, it is possible to input a plurality of area attributes.

Figure 18:
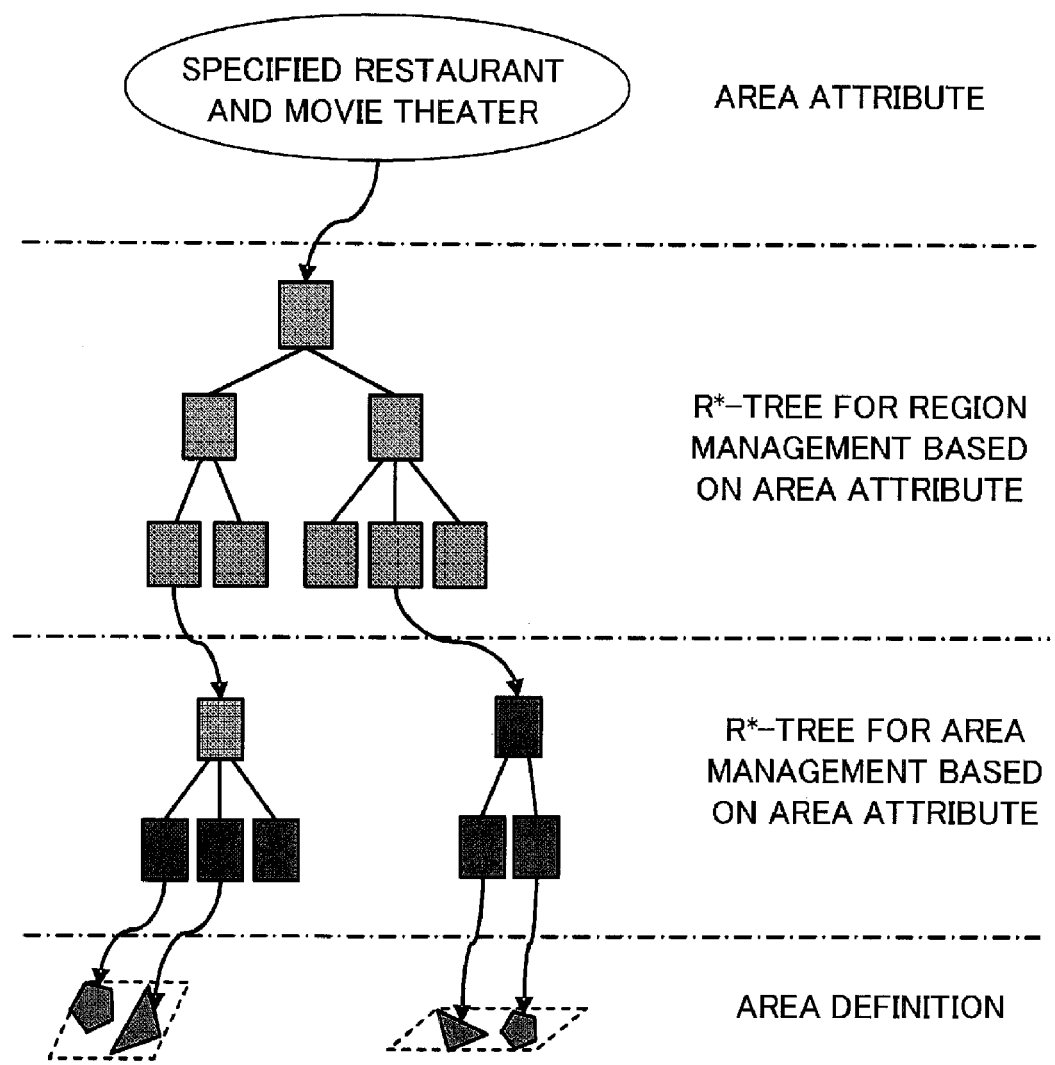
FIG. 18 is a diagram showing an index tree constructed on the basis of two area attributes of an embodiment of the present invention.
Figure 28:
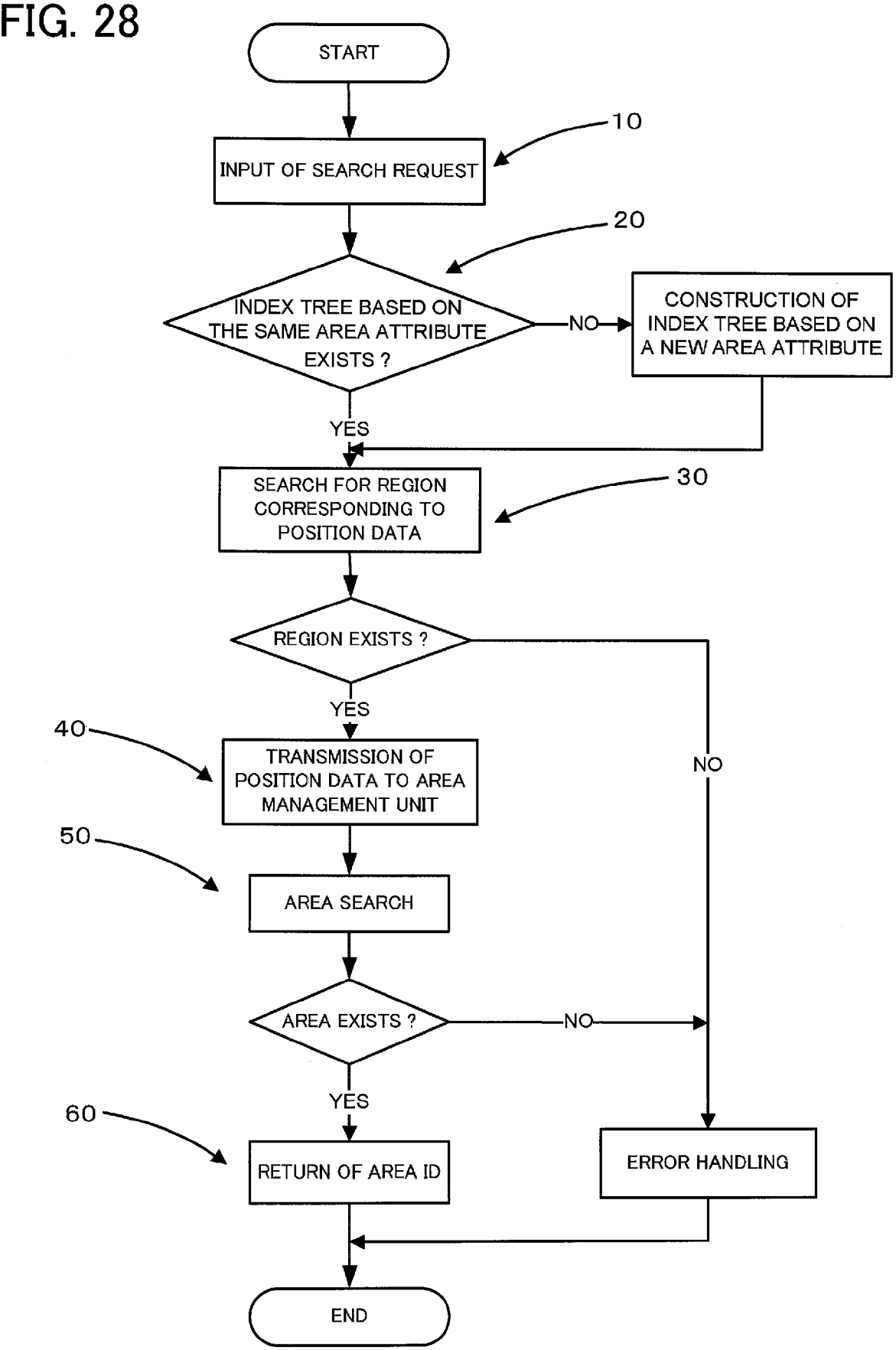
FIG. 28 is a flowchart concerning an embodiment of the present invention.

As shown in FIG. 18, as the area attributes, the service user can designate "restaurant" and "movie theater" and extract a service area satisfying both the conditions (FIG. 28).

A new index tree based on area attributes is constructed such that a search can be performed efficiently when a search based on the area attributes is performed after that.

10: Input of search requirements (position data and area attributes) by the service user:

The service user inputs data of a position where the service user is located at present and area attributes.

20: Check of presence of an index tree based on the same area attributes.

When an index tree based on the same area attributes is already present, since it is unnecessary to create a new index tree based on area attributes, the system shifts to Step 30.

When an index tree based on the same area attributes is not present, the system constructs a new index tree based on area attributes.

Figure 29:
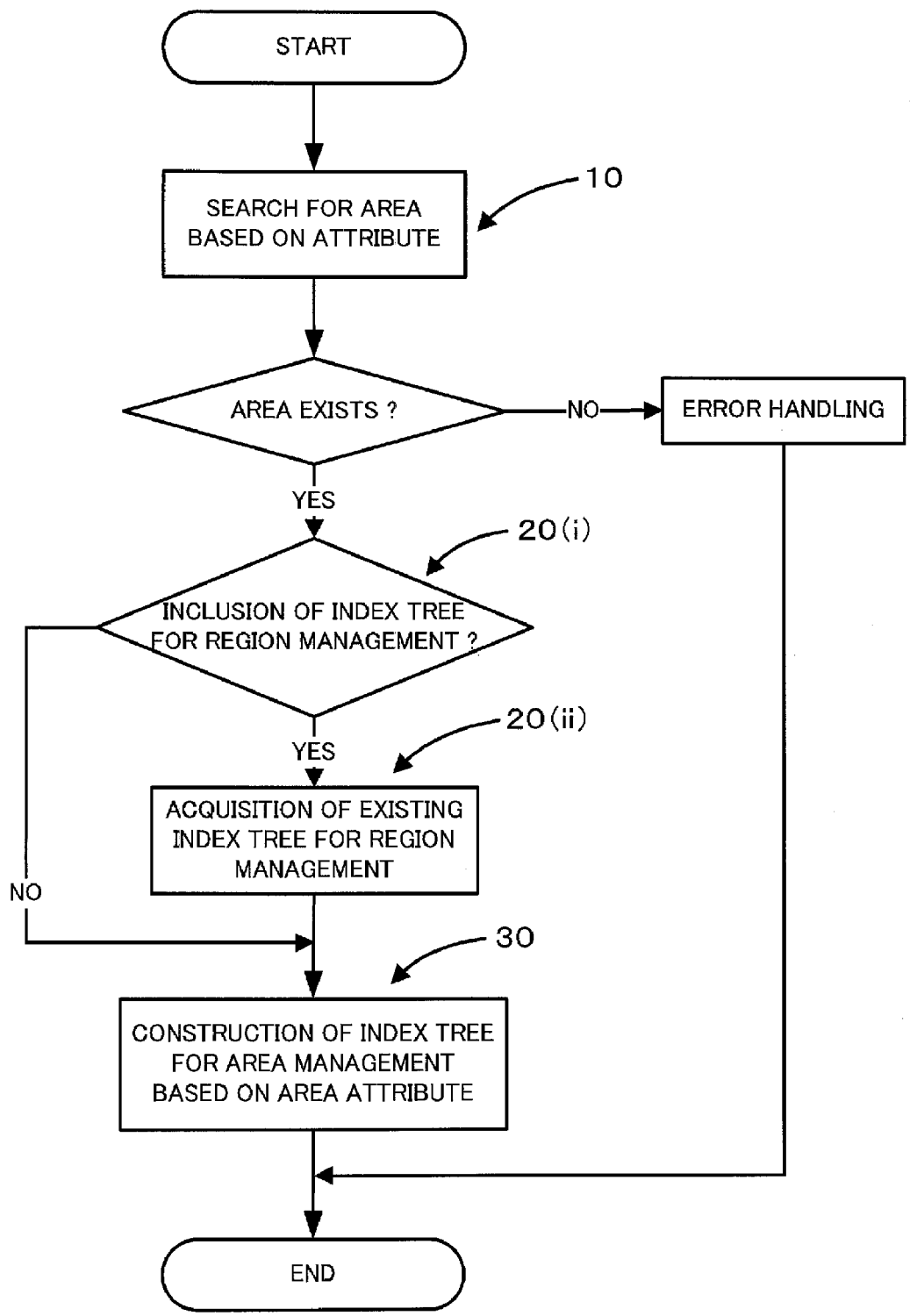
FIG. 29 is a flowchart concerning an embodiment of the present invention.

An algorithm for constructing a new index tree based on area attributes will be separately explained (described blow in reference to FIG. 29).

30: Search for a region corresponding to the position data

The system traverses the index tree for region management based on area attributes and searches a "region" corresponding to the position data.

When a region corresponding to the position data is present, the system shifts to Step 40. When a region corresponding to the position data is not present, the system finishes the search processing.

40: Transmission of the position data to an area management unit corresponding to the "region" found:

When the region corresponding to the position data is found, the system transmits the position data to an area management unit corresponding to the region found.

50: Search through the index tree for area management based on area attributes:

The system performs an area search using the index tree for area management based on spatial coordinate resolution used for area definition in the area management unit.

60: Returning an area identifier found.

(c) Algorithm for Constructing a New Index Tree Based on Area Attributes:

An algorithm for constructing a new index tree based on area attribute when the same index tree based on area attributes is not present already in (b) above will be explained (FIG. 29).

10: Search concerning area attributes:

The system performs a search based on area attributes and retrieves an area corresponding to the area attributes.

Figure 16:
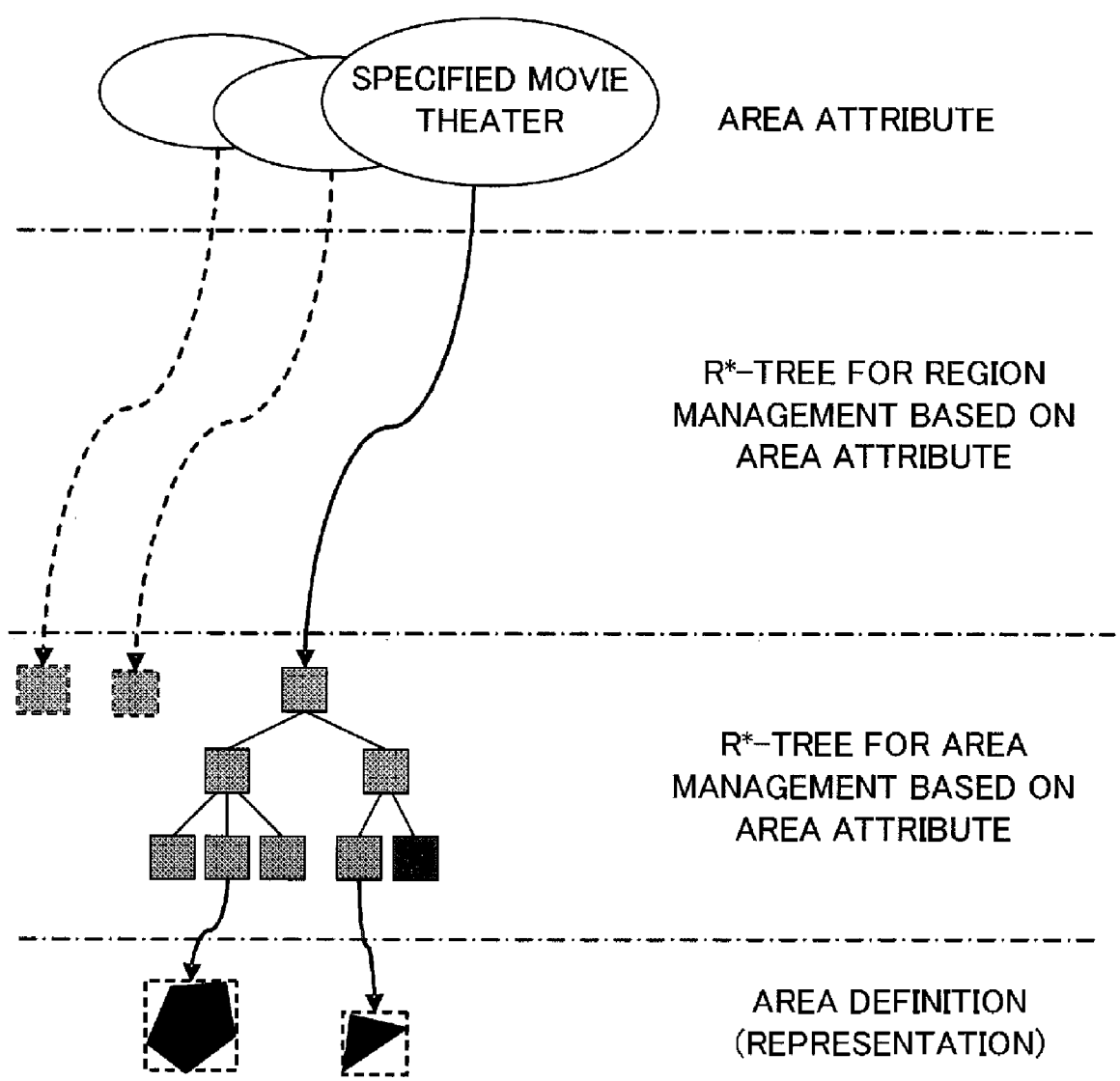
FIG. 16 is a diagram showing an attribute-based index tree for area management of an embodiment of the present invention.

20: Use of an index tree for region management corresponding to the area attributes:

(i) When an index tree based on area attributes not including an index tree for region management is constructed (FIG. 16), the system shifts to Step 30.

Figure 17:
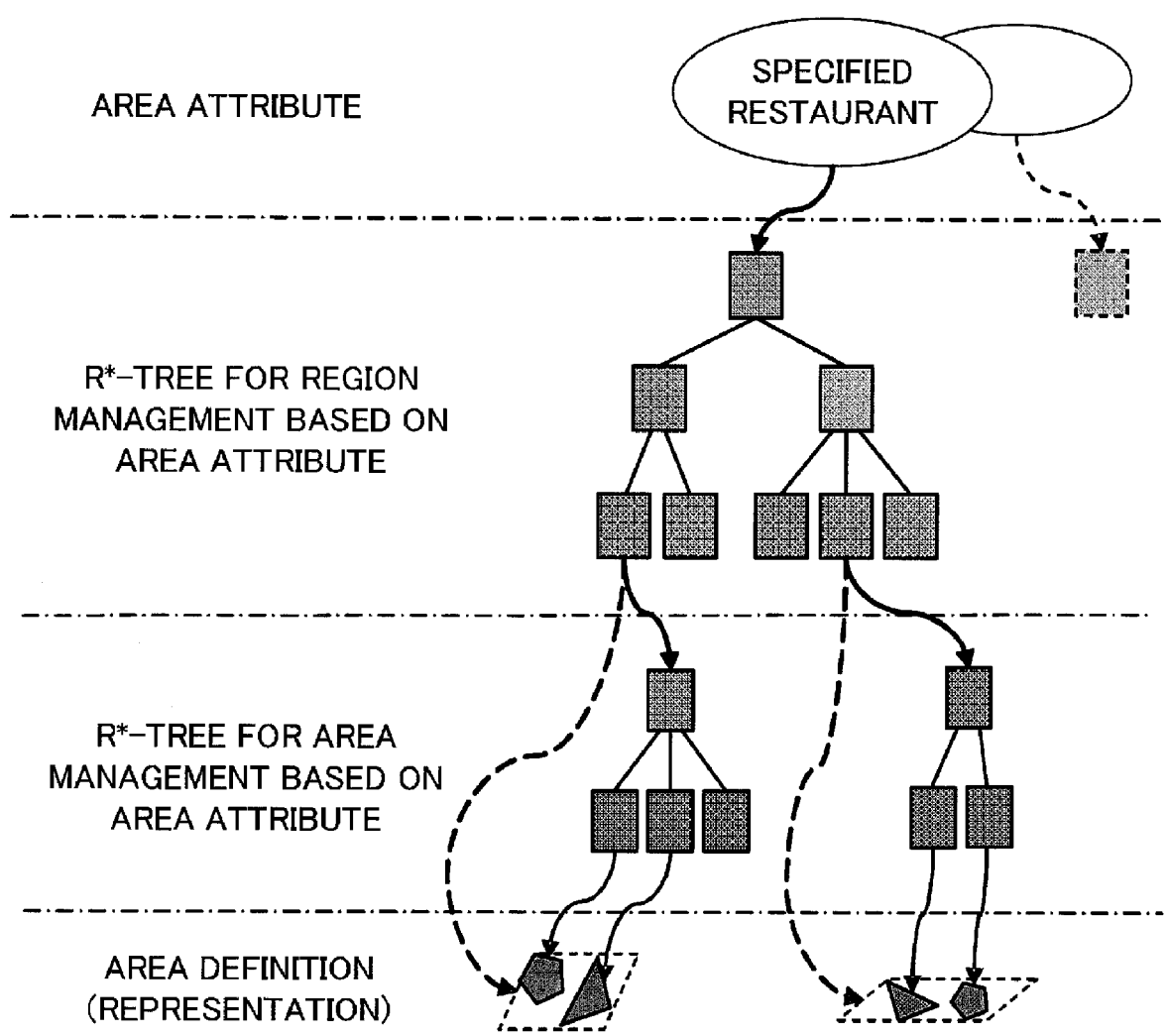
FIG. 17 is a diagram showing an attribute-based index tree for area management and region management of an embodiment of the present invention.

(ii) When an index tree based on area attributes including an index tree for region management is constructed (FIG. 17), the system retrieves the index tree for region management based on area attributes already present.

30: Construction of an index tree for area management based on area attributes:

40: End.

One or more of the following effects can be obtained in the disclosed embodiments.

(1) The "R-tree", which is one of multi-dimensional indexes, is a data structure for managing a group of objects having a width (a spread) in the field of CAD and the like and suitable for use in a dynamic environment in which data update is often performed.

It is possible to efficiently execute a spatial search for finding out to which area a position of a mobile user belongs at a high speed by representing and managing a service provision area using a data structure based on the "R*-tree" with search efficiency further improved.

(2) It is possible to define service provision areas in an overlapping manner by using the "R*-tree" in which overlapping of bounding rectangles used for representation of objects is possible. Thus, a management system for area data that can be used by a provider of a plurality of different services or a plurality of service providers is obtained.

(3) In management of area data, it is possible to define areas of various types and granularities, such as blocks of a town, buildings in the blocks, floors in the buildings, shops on the floors, and specific places in the shops. Thus, it is possible to flexibly and easily allocate services to the areas.

The invention claimed is:

1. An apparatus for managing area data, comprising:
a first storage for area data;
a second storage for area data;
a storage for data associated with an area; and
a storage for region data, wherein:
the first storage for area data stores one or more first data structures for area management;
the first data structure for area management includes:
a first index data structure including a first root node corresponding to a first set of areas containing a first area, first non-leaf nodes, and first leaf nodes; and
a first data storage corresponding to the first leaf nodes;
the second storage for area data stores one or more second data structures for area management constructed on the basis of area data collected from data in the first storage for area data based on one or more area attributes designated by a user;
the second data structure for area management includes:
a second index data structure including a second root node corresponding to a second set of areas containing second areas collected based on the one or more area attributes designated, second non-leaf nodes, and second leaf nodes; and
a second data storage corresponding to the second leaf nodes;
the storage for data associated with an area stores data associated with an area corresponding to the first areas and the second areas;
the storage for region data stores a data structure for region management that is constructed on the basis of a node associated with a region which contains at least one or more of the first sets of areas; and
the data structure for region management includes a data structure in which at least one node for identifying the region links to either the first root node or the second root node.

2. An apparatus for managing area data according to claim 1, wherein:
the data structure for region management comprises a third index data structure including a third root node corresponding to a set of regions containing the region, third non-leaf nodes, and third leaf nodes corresponding to nodes identifying the region; and
the data structure for region management includes a structure in which the third leaf nodes link to either the first root node or the second root node.

3. An apparatus for managing area data according to claim 2, further comprising:
means for accepting a request for change of data related to the first area of the first index data structure;
means for judging whether a region corresponding to the first area is present in the third index data structure;
means for adding, when the region is not present, a region corresponding to the first area to the third index data structure; and
means for expanding, when the region is present but does not contain the entire first area, the region corresponding to the first area to the third index data structure so that the region contains the entire first area.

4. An apparatus for managing area data according to claim 2, further comprising:
means for accepting a request for change of data related to the first area of the index data structure and attributes of the first area; and
means for changing, when the second index data structure corresponding to attributes of the area is present, the data related to the first area and deleting the second index data structure.

5. An apparatus for managing area data according to claim 4, further comprising:
means for accepting data of position data designated by a user;
means for accessing, based on the data accepted, the data structure for region management and the first data structure for area management and scanning at least one of the nodes to select data of the storage for data associated with an area; and
means for outputting the data selected.

6. An apparatus for managing area data according to claim 5, further comprising a storage for data associated with a user, for storing data concerning the user, wherein:
the storage for data associated with an area further stores data concerning a service provider and data concerning the area attributes; and
the apparatus for managing area data further comprises:
means for accepting data of at least one of position data designated by the user, the data concerning the user, the data concerning the service provider, and data concerning the area attributes;
means for accessing, based on the data accepted, the data structure for region management and the first data structure for area management or the second data structure for area management and scanning at least one of the nodes to select data of the storage for data associated with an area; and
means for outputting the data selected.

7. An apparatus for managing area data according to claim 1, wherein:
each one of the nodes of the data structure for region management has a meaning designated by its position; and
the data structure for region management includes a structure in which at least one node among the nodes links to either the first root node or the second root node.

8. An apparatus for managing area data according to claim 1, wherein the data structure for region management has one hierarchy and has a structure in which at least one node identifying the region included in the one hierarchy links to either the first root node or the second root node.

9. An apparatus for managing area data according to claim 1, wherein the data structure for area management includes a structure of any one of (a) to (e):

(a) a structure in which:
  the area is approximated by an approximating polygon;
  the leaf nodes of the index data structure include data based on a first minimum bounding rectangle of the approximating polygon;
  the non-leaf nodes include data based on a second minimum bounding rectangle containing a set including one or more of the first minimum bounding rectangles; and
  the data storage is constructed on the basis of quadtree data derived from the approximating polygon of the area;
(b) a structure in which:
  the area is approximated by one or more rectangles;
  the leaf nodes of the index data structure include data based on a first minimum bounding rectangle including the one or more rectangles;
  the non-leaf nodes include data based on a second minimum bounding rectangle containing a set including one or more of the first minimum bounding rectangles; and
  the data storage is constructed on the basis of the rectangles of the area;
(c) a structure in which:
  the area is approximated by a polyline composed of one or more straight lines;
  the leaf nodes of the index data structure include data based on a first minimum bounding rectangle of the straight lines;
  the non-leaf nodes include data based on a second minimum bounding rectangle containing a set including one or more of the first minimum bounding rectangles; and the data storage is constructed on the basis of the one or more straight lines;
(d) a structure in which:
  the area is approximated by a curved line and the curved line is approximated by a polyline composed of one or more straight lines;
  the leaf nodes of the index data structure include data based on a first minimum bounding rectangle of the straight lines;
  the non-leaf nodes include data based on a second minimum bounding rectangle containing a set including one or more of the first minimum bounding rectangles; and
  the data storage is constructed on the basis of the one or more straight lines; and
(e) a structure in which:
  the area is curve-approximated by spline interpolation;
  the leaf nodes of the index data structure include data based on a first minimum bounding rectangle of the curve produced by application of the spline interpolation;
  the non-leaf nodes include data based on a second minimum bounding rectangle containing a set including one or more of the first minimum bounding rectangles; and
  the data storage is constructed on the basis of the curve produced by application of the spline interpolation.

10. An apparatus for managing area data according to claim 1, wherein spatial coordinate resolution of the region for constructing the data structure for region management is set independently from spatial coordinate resolution of the first area and the second area for constructing the first index data structure and the second index data structure.

11. A computer program product for managing a first storage for area data, a second storage for area data, a storage for data associated with an area, and a storage for region data, said product comprising a program which is executed in an apparatus for managing area data having a structure in which:
  the first storage for area data stores one or more first data structures for area management;
  the first data structure for area management includes:
    a first index data structure including a first root node corresponding to a first set of areas containing a first area, first non-leaf nodes, and first leaf nodes; and
    a first data storage corresponding to the first leaf nodes;
  the second storage for area data stores one or more second data structures for area management constructed on the basis of area data collected from data in the first storage for area data based on one or more area attributes designated by a user;
  the second data structure for area management includes:
    a second index data structure including a second root node corresponding to a second set of areas containing second areas collected based on the one or more area attributes designated, second non-leaf nodes, and second leaf nodes; and
    a second data storage corresponding to the second leaf nodes;
  the storage for data associated with an area stores data associated with an area corresponding to the first areas and the second areas;
  the storage for region data stores a data structure for region management that is constructed on the basis of a node associated with a region which contains at least one or more of the first sets of areas; and
  the data structure for region management includes a data structure in which at least one node for identifying the region links to either the first root node or the second root node.

* * * * *